(12) United States Patent
Chou et al.

(10) Patent No.: US 8,786,137 B2
(45) Date of Patent: Jul. 22, 2014

(54) DIGITAL WIRING DEVICE

(75) Inventors: Cheng-Lung Chou, Great Neck, NY (US); Paul Soccoli, New Hyde Park, NY (US); David Klamer, Zeeland, MI (US); Paul Duckworth, Holland, MI (US); Gordon Stannis, Saugatuck, MI (US); Joel Van Faasen, Holland, MI (US)

(73) Assignee: Leviton Manufacturing Co., Inc., Melville, NY (US)

( * ) Notice: Subject to any disclaimer, the term of this patent is extended or adjusted under 35 U.S.C. 154(b) by 1010 days.

(21) Appl. No.: 12/558,335

(22) Filed: Sep. 11, 2009

(65) Prior Publication Data

US 2011/0062896 A1     Mar. 17, 2011

(51) Int. Cl.
*H01H 35/00*    (2006.01)
(52) U.S. Cl.
USPC .......................................... 307/116; 307/140
(58) Field of Classification Search
USPC ........... 307/140, 141, 116, 117; 315/362, 360
See application file for complete search history.

(56) References Cited

U.S. PATENT DOCUMENTS

| | | | |
|---|---|---|---|
| 3,473,107 A | 10/1969 | Smalley | |
| 3,555,367 A | 1/1971 | Watson | |
| 3,598,937 A | 8/1971 | Balchunas | |
| 3,711,761 A | 1/1973 | Watson | |
| 3,740,680 A | 6/1973 | Schneidinger | |
| 3,939,361 A | 2/1976 | Aidala et al. | |
| 3,979,601 A | 9/1976 | Franklin | |
| 3,988,553 A | 10/1976 | Astle | |
| 4,002,925 A | 1/1977 | Monahan | |
| 4,112,313 A | 9/1978 | Kutin | |
| 4,194,182 A | 3/1980 | Martin | |
| 4,336,464 A | 6/1982 | Weber | |
| 4,338,562 A | 7/1982 | Terwilliger | |
| 4,349,748 A | 9/1982 | Goldstein et al. | |
| 4,360,739 A | 11/1982 | Goldstein | |

(Continued)

FOREIGN PATENT DOCUMENTS

| | | |
|---|---|---|
| CA | 124072 | 8/2008 |
| EP | 0167848 B1 | 8/1988 |

(Continued)

OTHER PUBLICATIONS

Intermatic Model DT500CH Series Digital Tinier, Installation and User Instructions, Aug. 12, 2009, Intermatic Incorporated, Spring Grove, Illinois, US, 8 pages.

(Continued)

*Primary Examiner* — Tung X Le
(74) *Attorney, Agent, or Firm* — Marger Johnson & McCollom PC

(57) ABSTRACT

A digital wiring device including a user interface panel, a digital display, and a paddle including a transparent portion to reveal the digital display and an opaque portion to cover the user interface panel. The paddle rotates from a first closed position to a second open position. A digital "schedule-at-a-glance" may be provided so that a user can quickly assess a schedule of events. The digital wiring device may include a back light to illuminate the digital display. The paddle may be operatively associated with the back light. A battery may provide an electrical current to power the digital wiring device in a battery backup mode, and the back light may be disabled based on the mode. The user interface panel may be used to schedule events or otherwise configure the digital wiring device.

19 Claims, 35 Drawing Sheets

(56) References Cited

U.S. PATENT DOCUMENTS

| | | | |
|---|---|---|---|
| 4,368,408 A | 1/1983 | Marcus | |
| D268,025 S | 2/1983 | Bevilaqua et al. | |
| D268,668 S | 4/1983 | Bevilaqua et al. | |
| 4,422,018 A | 12/1983 | Bailey | |
| 4,439,688 A | 3/1984 | Schornack | |
| D273,488 S | 4/1984 | Rosenbaum et al. | |
| D273,581 S | 4/1984 | Rosenbaum et al. | |
| 4,440,503 A | 4/1984 | Arichi et al. | |
| 4,494,012 A | 1/1985 | Coker | |
| RE31,848 E | 3/1985 | Nilssen | |
| 4,533,972 A | 8/1985 | Ohashi | |
| 4,570,216 A * | 2/1986 | Chan | 700/14 |
| D285,419 S | 9/1986 | Schwartz | |
| 4,668,878 A | 5/1987 | Wyss | |
| 4,712,019 A | 12/1987 | Nilssen | |
| D294,043 S | 2/1988 | Haines | |
| 4,777,384 A | 10/1988 | Altenhof et al. | |
| 4,835,413 A * | 5/1989 | Nilssen | 307/141 |
| 4,922,407 A | 5/1990 | Birk et al. | |
| 4,950,913 A | 8/1990 | Kephart | |
| 5,059,871 A | 10/1991 | Pearlman et al. | |
| D321,855 S | 11/1991 | Ross | |
| 5,063,355 A | 11/1991 | Sasaki et al. | |
| 5,088,071 A | 2/1992 | Miyamoto et al. | |
| 5,160,853 A * | 11/1992 | Simon et al. | 307/140 |
| 5,191,265 A | 3/1993 | D'Aleo et al. | |
| 5,258,656 A | 11/1993 | Pawlick | |
| 5,397,930 A | 3/1995 | Nilssen | |
| 5,399,940 A | 3/1995 | Hanna et al. | |
| 5,430,356 A | 7/1995 | Ference et al. | |
| 5,508,878 A | 4/1996 | Pecore | |
| 5,530,322 A | 6/1996 | Ference et al. | |
| D380,396 S | 7/1997 | Svarnias et al. | |
| D380,403 S | 7/1997 | Svarnias et al. | |
| 5,650,716 A | 7/1997 | Kim | |
| 5,662,213 A | 9/1997 | Kattler et al. | |
| D386,430 S | 11/1997 | Czerlanis et al. | |
| D389,073 S | 1/1998 | Schmidt et al. | |
| 5,715,214 A | 2/1998 | Svarnias | |
| 5,798,581 A | 8/1998 | Keagy et al. | |
| D402,902 S | 12/1998 | Chen | |
| D402,903 S | 12/1998 | Chen | |
| D406,775 S | 3/1999 | Kadono | |
| D408,303 S | 4/1999 | Janda et al. | |
| 5,898,240 A * | 4/1999 | Tsou | 307/141 |
| D409,505 S | 5/1999 | Janda et al. | |
| 6,005,308 A | 12/1999 | Bryde et al. | |
| D418,497 S | 1/2000 | Howard et al. | |
| 6,011,755 A | 1/2000 | Mulhall et al. | |
| 6,046,550 A | 4/2000 | Ference et al. | |
| 6,121,889 A | 9/2000 | Janda et al. | |
| D435,524 S | 12/2000 | Korhonen | |
| D445,745 S | 7/2001 | Norman | |
| 6,262,496 B1 | 7/2001 | Lamar et al. | |
| 6,262,497 B1 | 7/2001 | Muroi et al. | |
| D449,235 S | 10/2001 | Stekelenburg | |
| D449,541 S | 10/2001 | Stekelenburg | |
| D450,604 S | 11/2001 | Stekelenburg | |
| 6,340,868 B1 | 1/2002 | Lys et al. | |
| D455,359 S | 4/2002 | Stekelenburg | |
| 6,388,952 B2 | 5/2002 | Kim | |
| 6,429,549 B1 | 8/2002 | Muroi et al. | |
| 6,448,987 B1 | 9/2002 | Easty et al. | |
| D464,360 S | 10/2002 | Grundel et al. | |
| D464,577 S | 10/2002 | Timmer et al. | |
| D467,821 S | 12/2002 | Ogawa | |
| D476,995 S | 7/2003 | Kreikemeier et al. | |
| D484,817 S | 1/2004 | Stekelenburg | |
| D493,471 S | 7/2004 | McIntosh | |
| 6,761,470 B2 | 7/2004 | Sid | |
| 6,815,625 B1 | 11/2004 | Leopold et al. | |
| D500,686 S | 1/2005 | Stekelenburg | |
| D500,687 S | 1/2005 | Morrison et al. | |
| D505,135 S | 5/2005 | Sapp et al. | |
| 6,891,284 B2 * | 5/2005 | Tilley | 307/116 |
| 6,903,284 B2 | 6/2005 | Dunfield et al. | |
| 6,917,167 B2 | 7/2005 | Courtney et al. | |
| 6,933,686 B1 | 8/2005 | Bishel | |
| D514,121 S | 1/2006 | Johnson | |
| D518,395 S | 4/2006 | Yamada | |
| 7,111,952 B2 | 9/2006 | Veskovic | |
| D530,339 S | 10/2006 | Hernandez et al. | |
| D534,875 S | 1/2007 | Wu | |
| 7,166,970 B2 | 1/2007 | Johnson et al. | |
| D538,822 S | 3/2007 | Andre et al. | |
| 7,251,142 B2 | 7/2007 | Lui | |
| D554,659 S | 11/2007 | Hoover et al. | |
| D554,660 S | 11/2007 | Hoover et al. | |
| D554,661 S | 11/2007 | Hoover et al. | |
| D561,193 S | 2/2008 | O'Mullan et al. | |
| D566,722 S | 4/2008 | Jackson | |
| D571,821 S | 6/2008 | Amacker | |
| 7,386,424 B2 | 6/2008 | DeBoer et al. | |
| D574,395 S | 8/2008 | Loretan et al. | |
| D576,565 S | 9/2008 | Chou et al. | |
| D576,566 S | 9/2008 | Wu et al. | |
| D580,451 S | 11/2008 | Steele et al. | |
| D581,425 S | 11/2008 | Jasinski | |
| D581,426 S | 11/2008 | Jasinski | |
| D585,075 S | 1/2009 | Flynt et al. | |
| D587,660 S | 3/2009 | Lin | |
| D589,829 S | 4/2009 | Friedli | |
| D598,396 S | 8/2009 | Lee | |
| D598,927 S | 8/2009 | Hirsch et al. | |
| D602,014 S | 10/2009 | Andre et al. | |
| D606,028 S | 12/2009 | Chou | |
| D606,029 S | 12/2009 | Chou | |
| D608,793 S | 1/2010 | Canu-Chiesa | |
| D609,650 S | 2/2010 | Chou et al. | |
| 7,667,155 B1 | 2/2010 | Ni et al. | |
| D611,003 S | 3/2010 | Muirhead et al. | |
| D611,845 S | 3/2010 | Sadler et al. | |
| D611,899 S | 3/2010 | Yang | |
| D614,192 S | 4/2010 | Takano et al. | |
| D614,652 S | 4/2010 | Arnell | |
| D614,653 S | 4/2010 | Arnell | |
| D615,100 S | 5/2010 | Canu-Chiesa | |
| D618,901 S | 7/2010 | Leifeld et al. | |
| D618,902 S | 7/2010 | Leifeld et al. | |
| D618,903 S | 7/2010 | Leifeld et al. | |
| D618,904 S | 7/2010 | Leifeld et al. | |
| D619,350 S | 7/2010 | Leifeld et al. | |
| D619,614 S | 7/2010 | O'Mullan et al. | |
| D619,800 S | 7/2010 | Leifeld et al. | |
| D619,972 S | 7/2010 | Felegy et al. | |
| 8,314,517 B2 * | 11/2012 | Simard et al. | 307/140 |
| 2004/0002792 A1 | 1/2004 | Hoffknecht | |
| 2004/0207342 A1 | 10/2004 | Novikov | |
| 2005/0023118 A1 | 2/2005 | Dunfield et al. | |
| 2005/0110416 A1 | 5/2005 | Veskovic | |
| 2006/0125324 A1 * | 6/2006 | Lai Lui | 307/141.4 |
| 2006/0146652 A1 | 7/2006 | Huizi et al. | |
| 2007/0097793 A1 | 5/2007 | Nguy et al. | |
| 2007/0193863 A1 | 8/2007 | Wu | |
| 2008/0061633 A1 | 3/2008 | Blair et al. | |
| 2008/0077360 A1 | 3/2008 | DeBoer et al. | |
| 2009/0159415 A1 | 6/2009 | Burrell et al. | |
| 2009/0213698 A1 | 8/2009 | Ostrovsky et al. | |
| 2009/0256534 A1 * | 10/2009 | Videtich et al. | 323/235 |

FOREIGN PATENT DOCUMENTS

| | | | |
|---|---|---|---|
| EP | 0156864 B1 | 11/1988 | |
| EP | 0316913 A2 | 5/1989 | |
| EP | 0376409 A2 | 7/1990 | |
| EP | 0141655 B1 | 2/1991 | |
| EP | 0259639 B1 | 2/1991 | |
| EP | 0394654 B1 | 2/1993 | |
| EP | 0745914 B1 | 3/1999 | |
| EP | 0730209 B1 | 4/1999 | |
| EP | 1734795 A1 | 12/2006 | |
| WO | 8102808 A1 | 10/1981 | |
| WO | 2004086195 A2 | 10/2004 | |
| WO | 2006074118 A2 | 7/2006 | |

(56) References Cited

FOREIGN PATENT DOCUMENTS

OTHER PUBLICATIONS

Intermatic Model DT500CL Series Digital Timer, Installation and User Instructions, Aug. 12, 2009, Intermatic Incorporated, Spring Grove, Illinois, US, 8 pages.
6124H-W, Product Specifications/Info, 2007, Leviton Manufacturing Co., Inc., Melville, NY, US, 1 page.
Leviton Residential Catalog, 2008, pp. 43-53, 76-77, 198-203 and 213-217, Leviton Manufacuturing Co., Inc., Melville, NY, US, 278 pages.
Wireless Wall Switch Receiver and Self-Powered Remote Switch, 2008, Leviton Manufacturing Co., Inc., Melville, NY, US, 2 pages.
Wireless Sensing Solution, 2008, Leviton Manufacturing Co., Inc., Melville, NY, US, 7 pages.
Wireless Occupancy Sensor Products Installation Instructions, 2008, Leviton Manufacturing Co., Inc., Melville, NY, US, 3 pages.
Intermatic Model DT500CH Series Digital Timer, Installation and User Instructions, Jun. 4, 2009, Intermatic Incorporated, Spring Grove, Illinois, US, 8 pages.
Intermatic Model DT500CL Series Digital Timer, Installation and User Instructions, Jun. 4, 2009, Intermatic Incorporated, Spring Grove, Illinois, US, 8 pages.
NE5C Plug in Photo Control, Product Fact Sheet, Intermatic Incorporated, Spring Grove, IL, Jun. 12, 2002, 1 page.
DT121C Digital Plug in Timer, Product Fact Sheet, Intermatic Incorporated, Spring Grove, IL, Aug. 1, 2003, 1 page.
Vizia-RF Scene Capable Plug-in Appliance and Lamp Dimming Modules, Leviton Manufacturing Co., Inc., Little Neck, NY, 2006, 4 pages.
Intermatic General Catalog, Indoor Plug-In Timers, Intermatic Incorporated, Spring Grove, IL, 2008, p. 178.
Model DT500CH Series Digital Timer, Installation and User Instructions, Intermatic Incorporated, Oct. 27, 2009, 4 pages.
Intermatic Electronic In-Wall Time Switch, EI Series, Sep. 9, 2010, 4 pages.
Intermatic Electronic 7-Day In-Wall Time Switch, EI500 Series, 2003, 6 pages.
Intermatic, Digital In-Wall Timer ST01C, Mar. 2007, 1 page.

\* cited by examiner

DIGITAL WIRING DEVICE

BACKGROUND

Electrical lights, appliances, or other types of electrical devices may be controlled using an in-wall digital controller, commonly referred to as a digital timer or digital switch. Residential users and businesses alike are rapidly replacing conventional electrical wall switches in favor of the more automated functionality that a digital controller can provide. For example, a digital controller can be programmed to automatically turn on or off the electrical lights or other devices with which they are associated. In addition, events can be scheduled to run on certain days or at certain times.

Existing digital controllers can be difficult to use, hard to configure, or otherwise awkward in mechanical and operational design. Improvements in the ease-of-use, configuration, and operability would likely result in wider acceptance among both residential and business users, and ultimately, would lead to greater convenience.

DETAILED DESCRIPTION OF THE INVENTION

Figure 1:
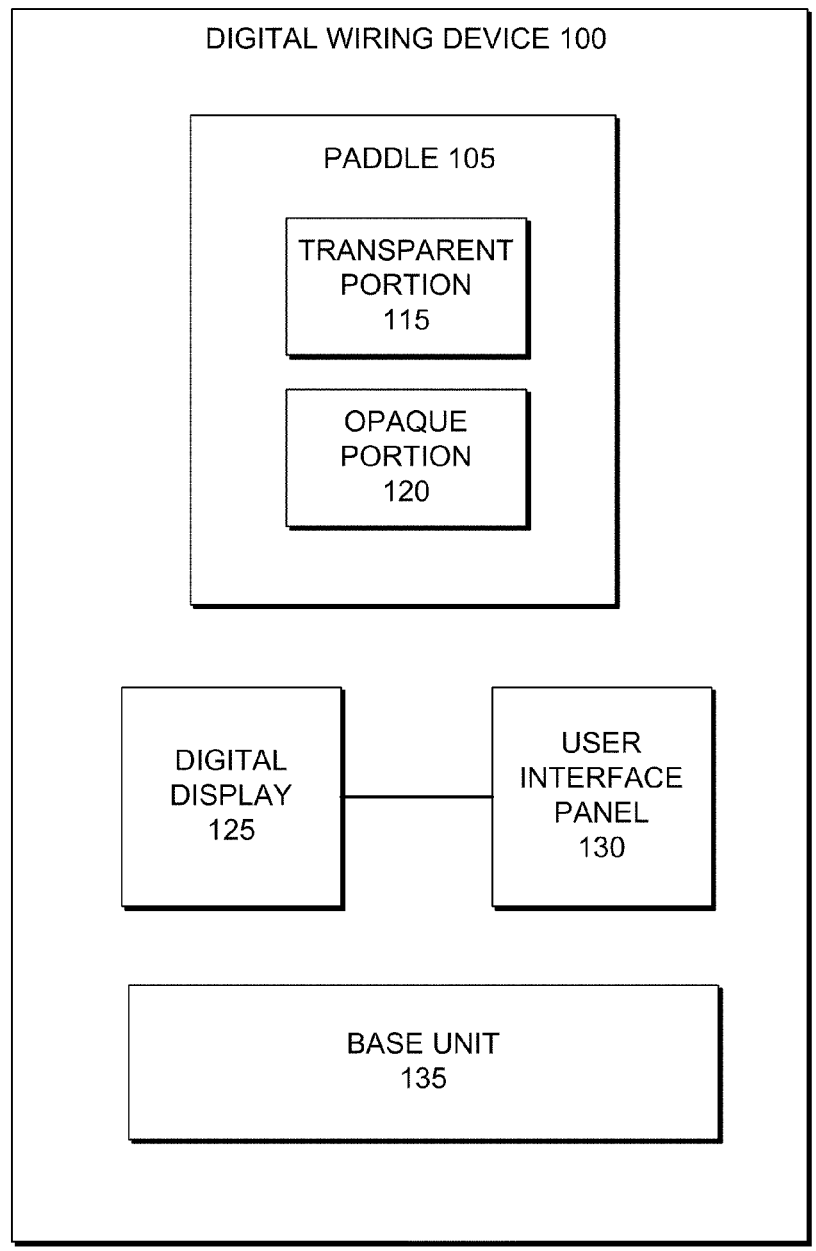
FIG. 1 is a block diagram of an in-wall digital wiring device according to some inventive principles of this patent disclosure.

FIG. 1 is a block diagram of a digital wiring device 100 according to some inventive principles of this patent disclosure. The wiring device may be mounted in any suitable location such as in a wall. Although frequently referred to herein as an "in-wall digital wiring device," it should be understood that persons with skill in the art may refer to the same as an "in-wall digital controller," an "in-wall digital timer," an "in-wall digital switch," or other "wiring device."

As generally used here, the term "digital wiring device" refers to a device having at least one building conductor connected thereto, thereby distinguishing from a portable device. The digital wiring device, as disclosed herein, can be mountable in an electrical gang box, and can control electrical lights, appliances, or other types of electrical devices. In addition, although sometimes referred to as an "in-wall" digital wiring device, such is not necessarily a requirement, and in a broader sense, the digital wiring device need not be configurable within a wall.

There are some embodiments where the digital wiring device can be in the form of a plug-in unit which can be plugged into standard electrical receptacles such as, but not limited to 15 or 20 Amp, 125 or 250 Volt receptacles.

Electrical wiring devices are typically installed into electrical boxes in fixed installations. Electrical boxes are alternately known as gang boxes, junction boxes, handy boxes, utility boxes, gem boxes, switch boxes, and outlet boxes. These boxes are typically supplied in standard widths, also known as "gangs." For example, a typical single-gang box has a nominal opening of 3" (inches) tall by 2" (inches) wide. For multiple gangs, the box width would be 1 13/16" (inches) wider for each additional gang.

The digital wiring device 100 includes a digital display 125, a user interface panel 130, and a base unit 135 which supports at least one of the digital display 125 and the user interface panel 130. The digital display 125 provides information to a user of the digital wiring device 100. The user interface panel 130 may receive information from the user. The digital wiring device 100 also includes a paddle 105 having a transparent portion 115 to reveal at least a portion of the digital display 125, and an opaque portion 120 to cover at least a portion of the user interface panel 130. The term "transparent portion," as used here and elsewhere, may refer to a window made of transparent materials such as clear plastic, glass, or other suitable materials. Alternatively, the term "transparent portion" may simply refer to open space, such as an opening through the paddle 105. Alternately, the transparent portion need not be 100% transparent and may have any suitable degree of transparency or it may be translucent. Also, rather than the opaque portion 120, or in addition to the opaque portion 120, a translucent portion 120 may cover at least a portion of the user interface panel 130. In addition, any portion of the paddle or the entire paddle itself may be transparent, opaque or any degree in between as desired by the user.

The paddle 105 can overlap at least in part the digital display 125. Moreover, the paddle 105 can be rotated from a closed position to an open position, and automatically held, or otherwise positioned and maintained, in the open position at a predefined location, for example about 110 degrees from a surface of the base unit 135. The inventive principles are not limited to this embodiment. For example, in other embodiments, the predefined location of the paddle 105 is about 90 degrees or greater from a surface of the base unit 135. The paddle 105 is movable to an open and maintained position forming an arc of about 90 degrees or greater between the base unit 135 and the paddle 105. In other words, the paddle 105 can have a rotatable range of not less than about 90 degrees.

The term "automatically held" or "maintained" as used herein describes a feature related to automatically holding the paddle 105 in a location without manual pressure, thereby countering the effects of gravity, and providing convenient access to the user interface panel 130. When the paddle 105 is automatically held, or otherwise positioned and maintained, in the open position, the user enjoys hands-free access to the user interface panel 130 and complete visibility of the digital display 125. When the paddle 105 is in the closed position, the transparent portion 115 reveals at least a portion of the digital display 125 and the opaque portion 120 covers at least a portion of the user interface panel 130.

Once the paddle 105 is opened and automatically held in position, the user enjoys convenient access to the user interface panel 130 to configure the digital wiring device 100. In other words, because the paddle 105 automatically remains at an angle greater than or equal to about 90 degrees from the surface of the base unit, the user need not manually hold the paddle 105 open while simultaneously attempting to configure the digital wiring device 100 using the user interface panel 130. This provides the user with simple access to the user interface panel 130 and full visibility of the digital display 125 without the need for manually holding the paddle 105 in place while configuring the digital wiring device 100. After the user configures the digital wiring device 100, the user can apply pressure to the paddle 105 to release and rotate the paddle 105 to the closed position.

The user may rotate the paddle 105 of the digital wiring device 100 from the open position to the closed position. Once in the closed position, at least a portion of the digital display 125 is revealed through the transparent portion 115 of the paddle 105. At about the same time that the digital display 125 is revealed through the transparent portion 115, at least a portion of the user interface panel is covered using the opaque portion 120 of the paddle 105.

Figure 2:
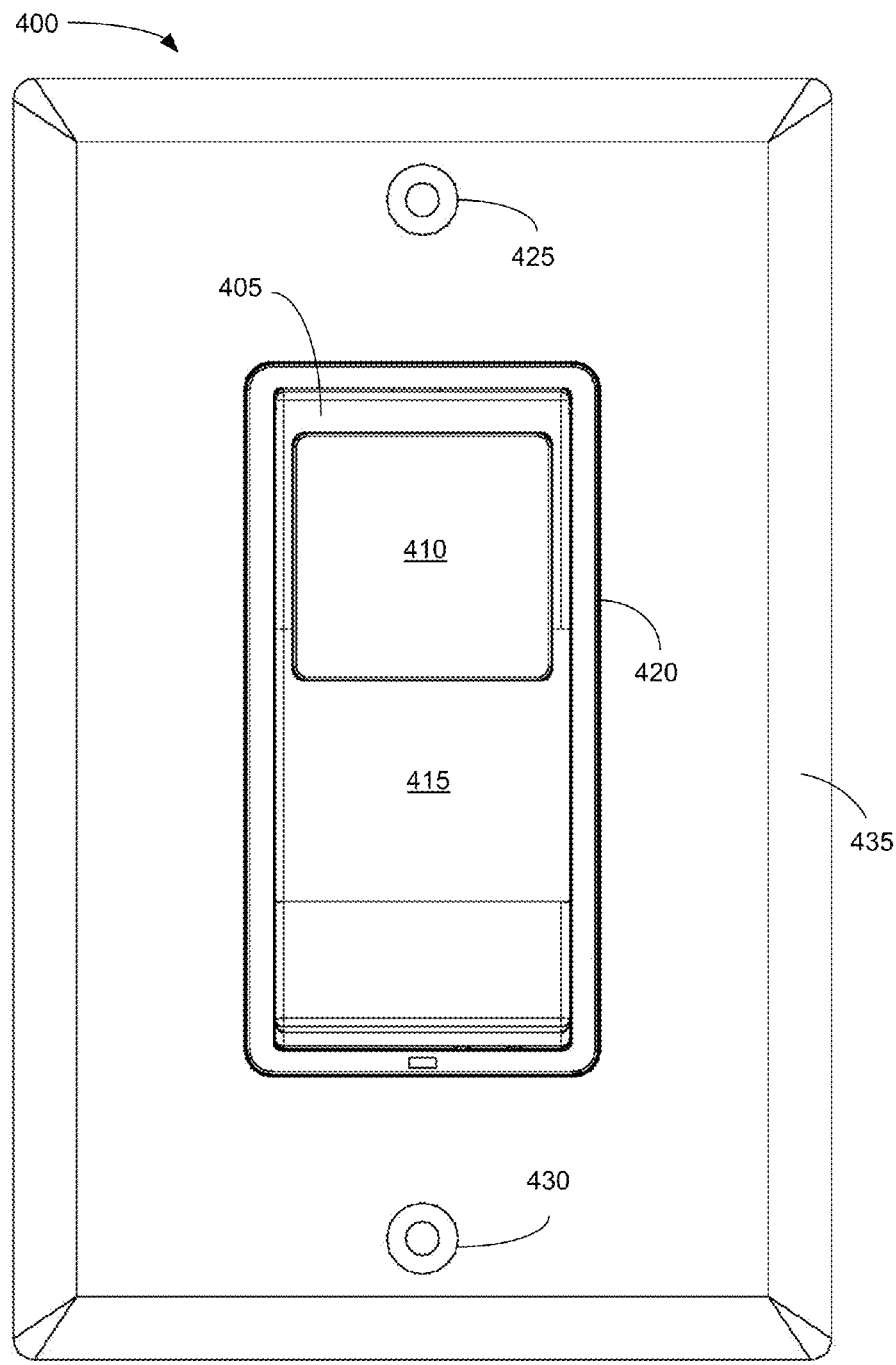
FIG. 2 illustrates a front elevation view of a digital wiring device when a paddle is in a closed position according to some inventive principles of this patent disclosure.

FIG. 2 illustrates a front elevation view of a digital wiring device 400 when a paddle 405 is in a closed position according to some inventive principles of this patent disclosure. The digital wiring device 400 includes a paddle 405 having a transparent portion 410 and an opaque portion 415. A frame 420 is hingedly attached to the paddle 405. As will be shown in detail, one end of the paddle 405 may rotate outwardly from the frame 420 and away from the digital wiring device 400 while another end of the paddle 405 remains attached to the frame 420. The digital wiring device 400 may also include a wall mount 435, which may include a wall plate 435 and openings 425 and 430 to attach the digital wiring device 400 in or about a wall.

Figure 3:
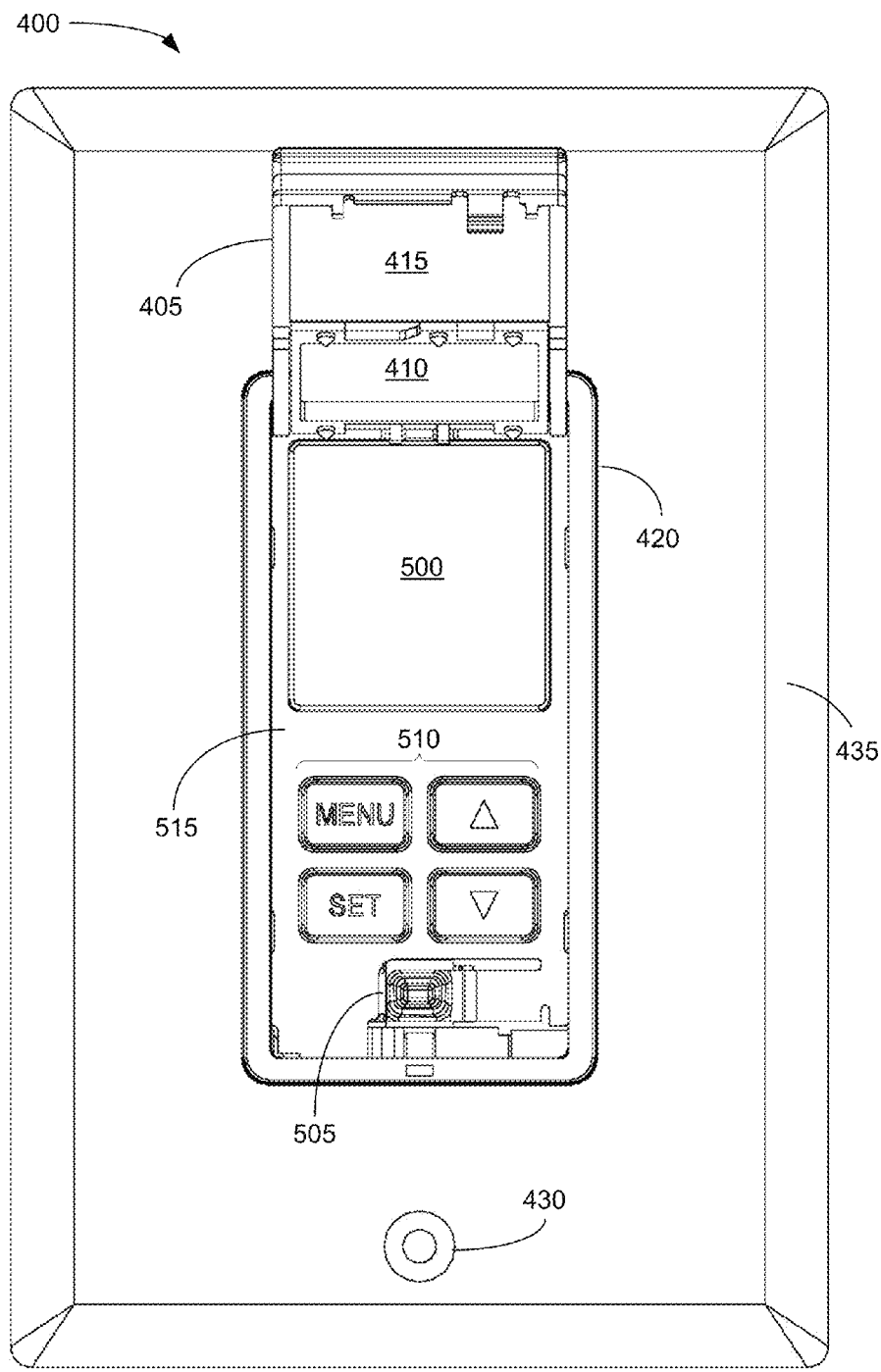
FIG. 3 illustrates a front elevation view of the digital wiring device of FIG. 2 when the paddle is in an open position according to some inventive principles of this patent disclosure.

FIG. 3 illustrates a front elevation view of the digital wiring device 400 of FIG. 2 when the paddle 405 is in an open position according to some inventive principles of this patent disclosure. A digital display 500 and a user interface panel 510 are accessible to the user when the paddle 405 is in the open position. Since the paddle 405 automatically remains in the open position, the user enjoys hands-free access to the digital display 500 and the user interface panel 510, and can therefore conveniently configure the digital wiring device 400.

In addition, the digital wiring device 400 may include a bezel 515 associated with the digital display 500 and the user interface panel 510. The bezel 515 forms a surface about, protects, and positions the digital display 500 and user interface panel 510. The user interface panel 510 may include one or more push buttons, such as a "menu" button, a "set" button, an "up" button, and a "down" button. Although push buttons are shown, it should be understood that other suitable user input interfaces may be used such as, for example, an actuator, touch sensitive screen, switch, knob, or any other suitable interface. An actuator 505 extends from the bezel 515. When the paddle is in the closed position, the actuator 505 extends to a back surface 415 of the paddle 405, and may be actuated by the back surface 415 of the paddle 405. The operations of the digital display 500, the user interface panel 510, and the actuator 505 will be more fully described below.

Figure 4:
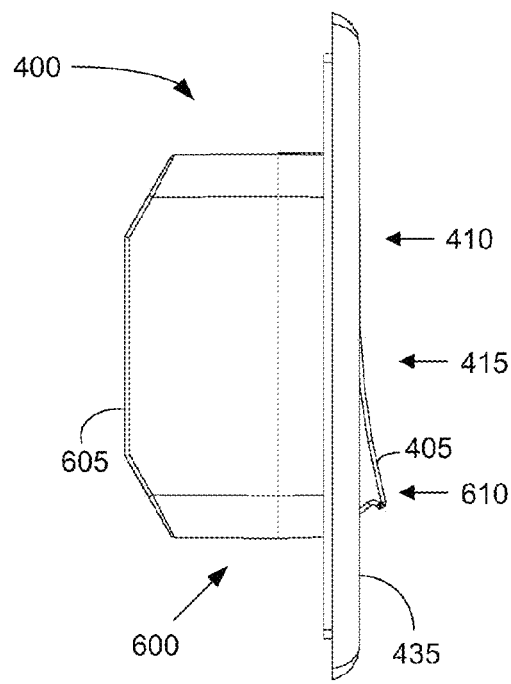
FIG. 4 illustrates a side elevation view of the digital wiring device of FIG. 2 when the paddle is in the closed position.

FIG. 4 illustrates a side elevation view of the digital wiring device 400 of FIG. 2 when the paddle is in the closed position. The digital wiring device 400 includes a base unit 600. The base unit 600 may include a housing 605 and may also include, for example, the bezel 515 (of FIG. 3), and other components within the housing 605. The wall plate 435 may be attached to the base unit 600 for mounting to a wall. The paddle 405 includes a gripping portion 610. The gripping portion 610 may be easily gripped and lifted by the user.

Figure 5:
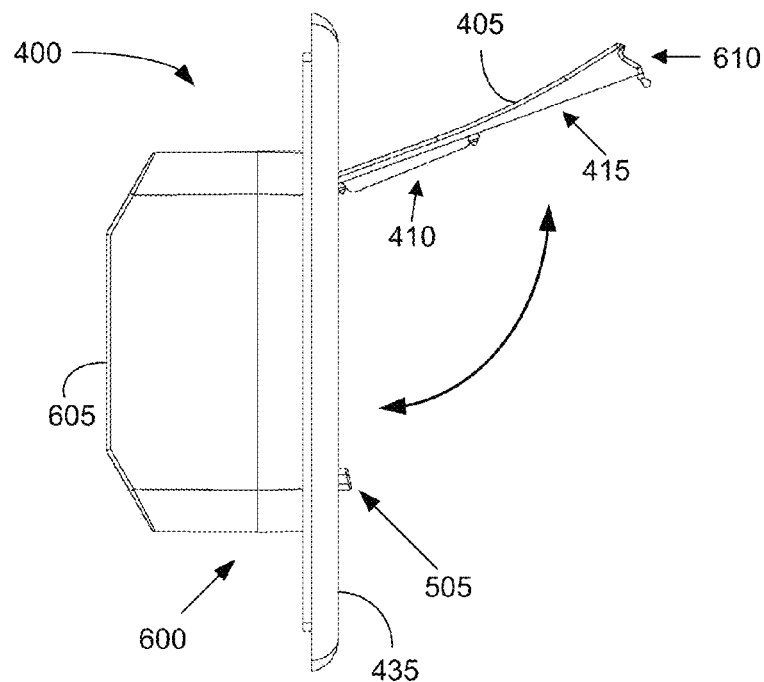
FIG. 5 illustrates a side elevation view of the digital wiring device of FIG. 2 when the paddle is in the open position.

FIG. 5 illustrates a side elevation view of the digital wiring device 400 of FIG. 2 when the paddle 405 is in the open position. One end of the paddle 405 may be rotated outwardly from the base unit 600. The paddle 405 may be automatically held, or otherwise positioned and maintained, in the open position at a predefined location, for example about 110 degrees from a front surface of the base unit 600, as shown in FIG. 5. The inventive principles are not limited to this embodiment. For example, in other embodiments, the predefined location of the paddle 405 is about 90 degrees or greater from the front surface of the base unit 600. The paddle 405 is movable to an open and maintained position forming an arc of about 90 degrees or greater between the base unit 600 and the paddle 405. In other words, the paddle 405 can have a rotatable range of not less than about 90 degrees.

An end portion of the actuator 505, also shown in FIG. 5, includes a surface that is angled to directly receive a similarly angled back surface 415 of the paddle 405. The paddle 405 may be opened when the user grips the gripping portion 610 and rotates the paddle 405, which is then automatically held into the open position after being rotated beyond a predefined angle, for example about 110 degrees, or in some embodiments about 90 degrees or greater, from the base unit 600. The user may then apply downward pressure to the paddle 405 to release the paddle from the open position, and to rotate the paddle to the closed position, as shown in FIG. 4.

Figure 6:
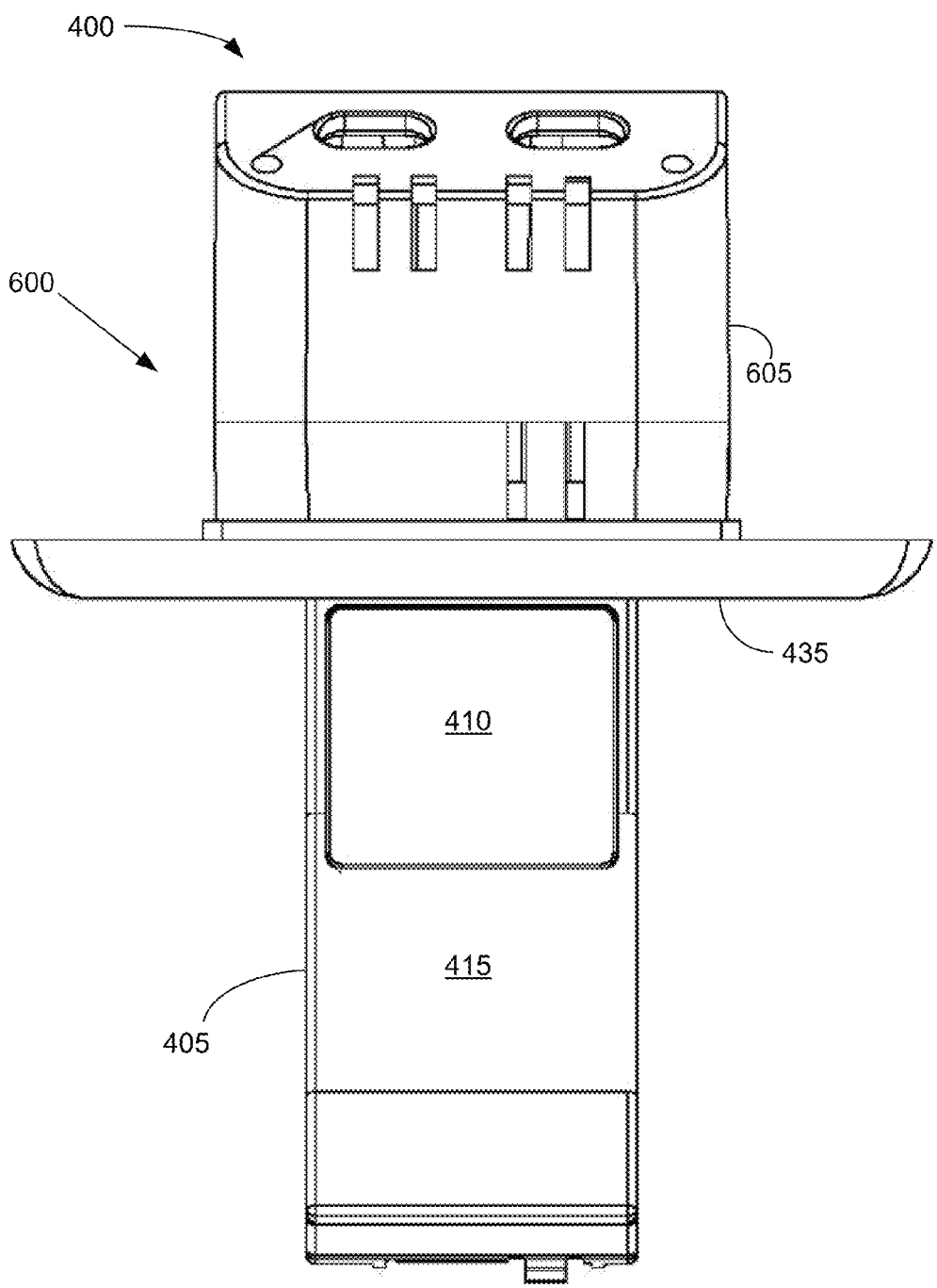
FIG. 6 illustrates a top view of the digital wiring device of FIG. 2 when the paddle is in the open position.
Figure 7:
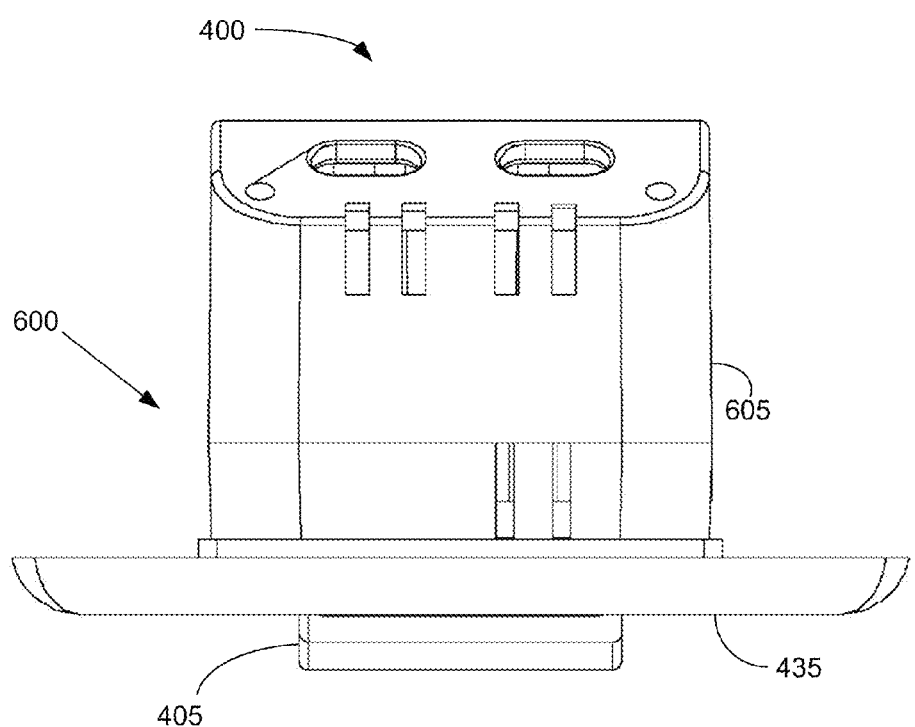
FIG. 7 illustrates a top view of the digital wiring device of FIG. 2 when the paddle is in the closed position.
Figure 8:
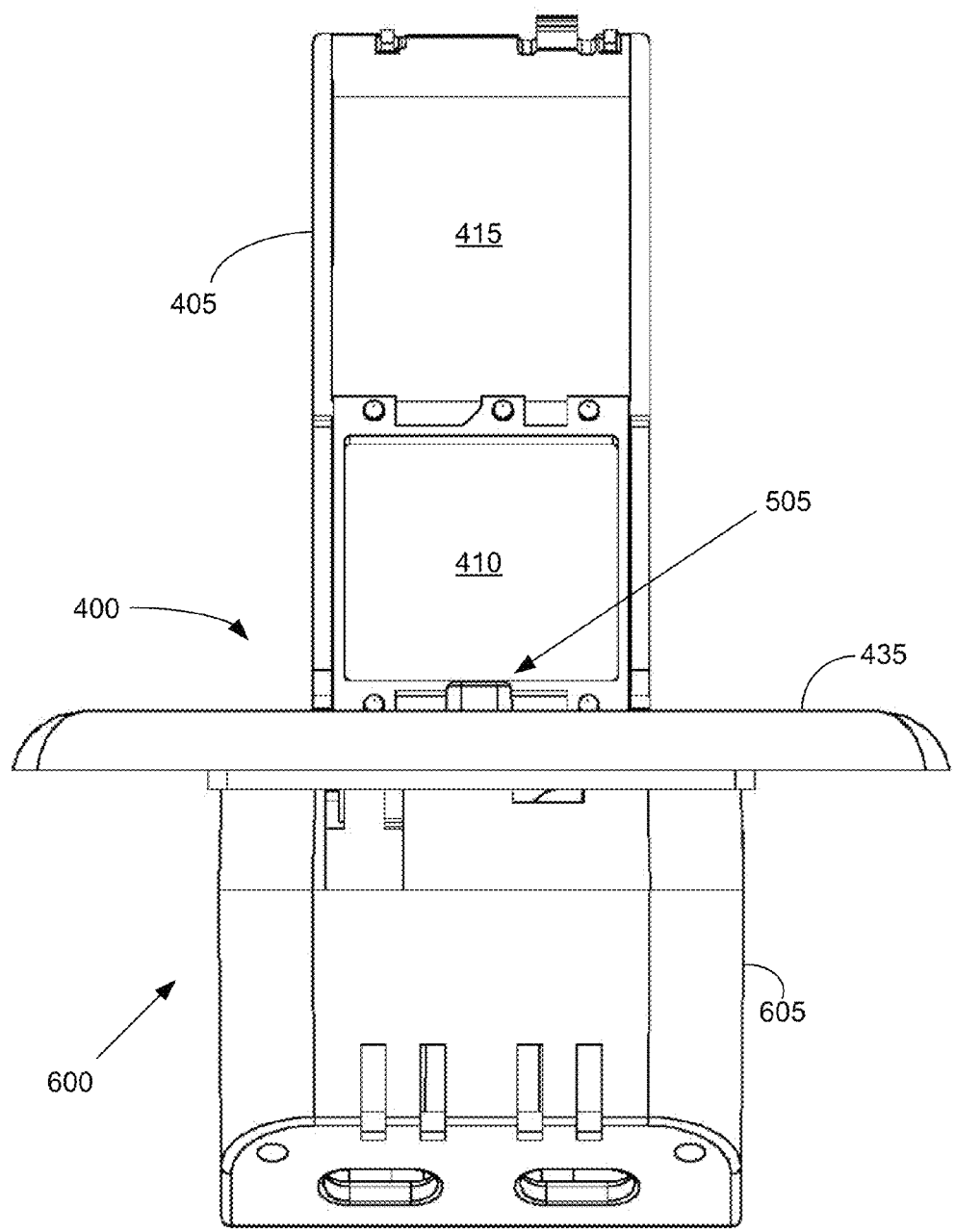
FIG. 8 illustrates a bottom view of the digital wiring device of FIG. 2 when the paddle is in the open position.
Figure 9:
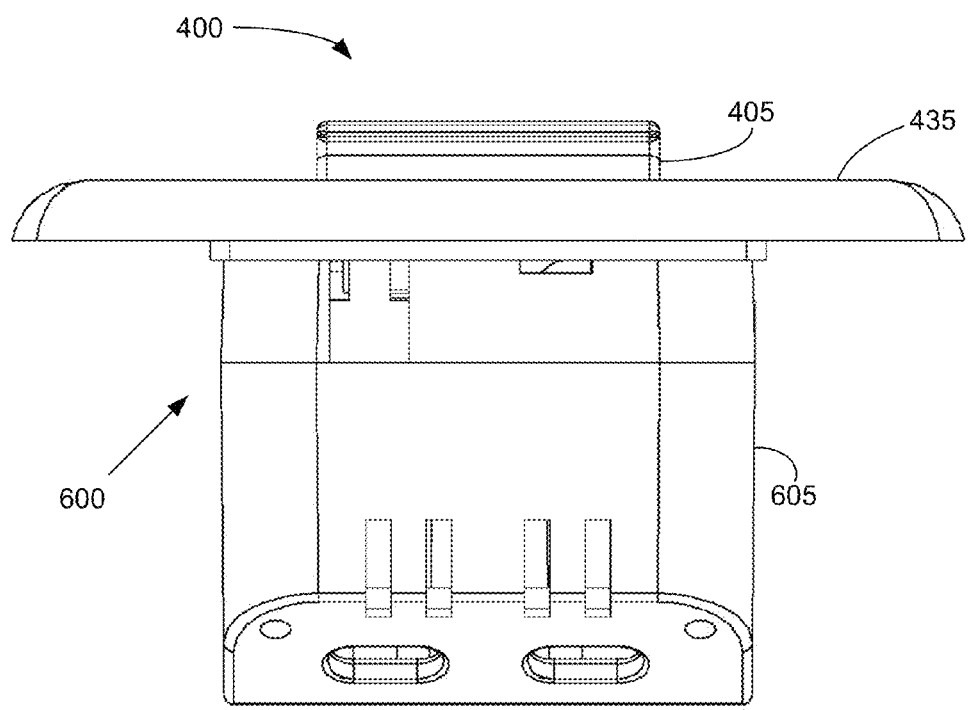
FIG. 9 illustrates a bottom view of the digital wiring device of FIG. 2 when the paddle is in the closed position.

FIG. 6 illustrates a top view of the digital wiring device 400 of FIG. 2 when the paddle 405 is in the open position. FIG. 7 illustrates a top view of the digital wiring device 400 of FIG. 2 when the paddle 405 is in the closed position. FIG. 8 illustrates a bottom view of the digital wiring device 400 of FIG. 2 when the paddle is in the open position. FIG. 9 illustrates a bottom view of the digital wiring device 400 of FIG. 2 when the paddle is in the closed position. The top and bottom views shown in FIGS. 6-9 correspond to an example embodiment of the digital wiring device 400.

Figure 10:
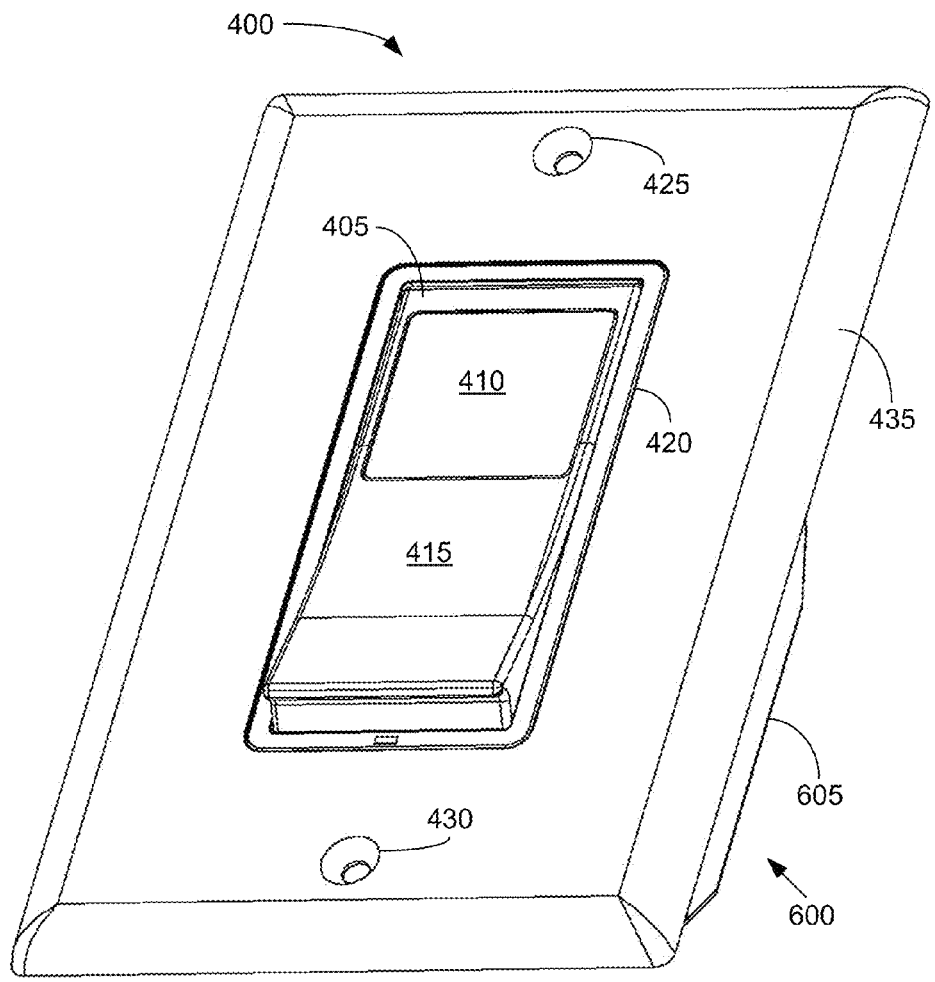
FIG. 10 illustrates a perspective view of the digital wiring device of FIG. 2 when the paddle is in the closed position.
Figure 11:
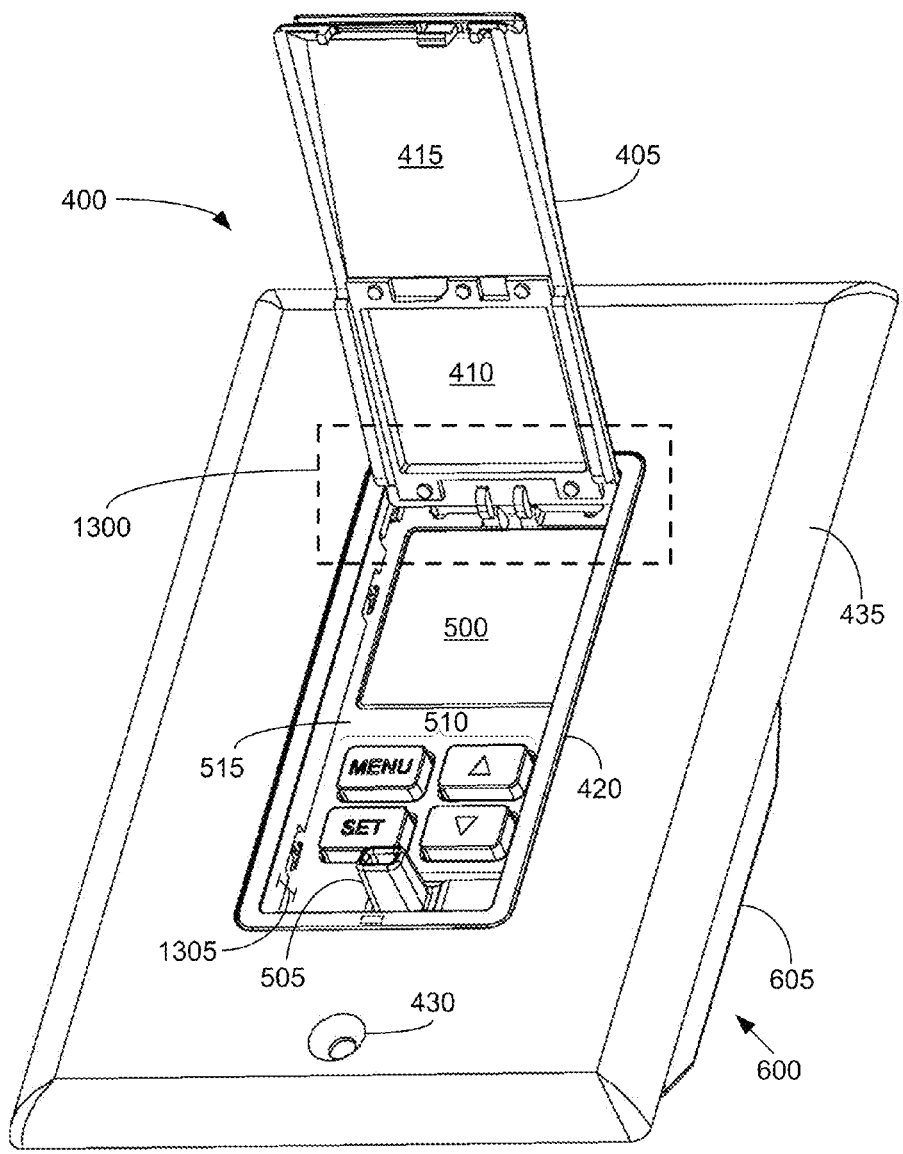
FIG. 11 illustrates a perspective view of the digital wiring device of FIG. 2 when the paddle is in the open position.

FIG. 10 illustrates a perspective view of the digital wiring device 400 of FIG. 2 when the paddle 405 is in the closed position. FIG. 11 illustrates a perspective view of the digital wiring device 400 of FIG. 2 when the paddle 405 is in the open position. Referring to FIGS. 10 and 11, the frame 420 is attached to the housing 605 of the base unit 600 and defines a region 1305 between the paddle 405 and the bezel 515 of the base unit 600. The actuator 505 may extend from a front surface of the base unit 600, i.e., from the bezel 515, through the region 1305. For example, the actuator 505 may extend to the back surface 415 of the paddle 405 when the paddle is in the closed position, and may be actuated by the back surface 415 of the paddle 405 when the paddle is in the closed position. More specifically, the actuator 505 may be actuated by the paddle 405 in the following manner. The paddle 405 is moveable to a stationary closed position, and further moveable to a temporary closed position in which the paddle is biased toward the stationary closed position by the actuator 505. In other words, the paddle 405 is moveable between at least a stationary closed position and a temporary closed position. The term "stationary" as used herein does not necessarily mean that the paddle is permanently stationary, but rather, that it is relatively stationary in comparison to the temporary closed position. A user can adjust (e.g., press) the paddle from the stationary closed position to the temporary closed position, thereby actuating the actuator. The temporary closed position is further indented from the stationary closed position. A region 1300 will now be further illustrated and described with reference to FIGS. 12-16.

Figure 12:
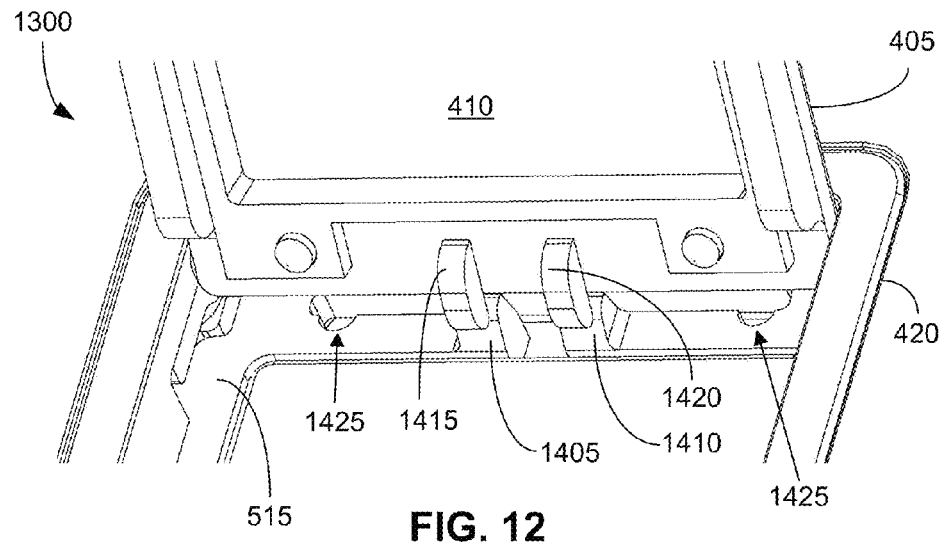
FIG. 12 illustrates a detailed perspective view of a hinge feature according to some inventive principles of this patent disclosure.

FIG. 12 illustrates a detailed perspective view of the hinge feature associated with region 1300 of FIG. 11, according to some inventive principles of this patent disclosure. The bezel 515 of the digital wiring device 400 may include one or more mating elements, such as mating elements 1405 and 1410. Although this example embodiment shows the bezel 515 including the mating elements, it should be understood that the mating elements 1405/1410 can be separate or different from the bezel 515. The paddle 405 may include one or more curved projections, such as curved projections 1415 and 1420. The mating elements may engage the curved projections to automatically hold, or otherwise maintain the paddle 405 in the open position. When the user applies pressure to position the paddle 405 in the automatically held open position, the curved projections 1415/1420 flex the mating elements 1405/1410 inwardly to the base unit 600 (of FIG. 4). Similarly, when the user applies pressure to release the paddle 405 from the automatically held position, and to close the paddle 405, the curved projections 1415/1420 flex the mating elements 1405/1410 inwardly to the base unit 600. The bezel 515 may include one or more notches 1425 to enhance the flexibility of mating elements 1405 and 1410. At least one of the mating elements or the curved projections is flexible. Flexibility of the mating elements 1405/1410 is improved by the shape and size of the notches 1425.

Alternatively, one of the projections 1415/1420 or the mating elements 1405/1410 are structured to flex the other of the projections 1415/1420 or the mating elements 1405/1410 responsive to a user positioning the paddle towards the open or closed position. Or, one of the projections 1415/1420 or the mating elements 1405/1410 may be structured to flex the other of the projections 1415/1420 or the mating elements 1405/1410 inwardly towards the base unit responsive to a user applying pressure to release and close the paddle.

Figure 13:
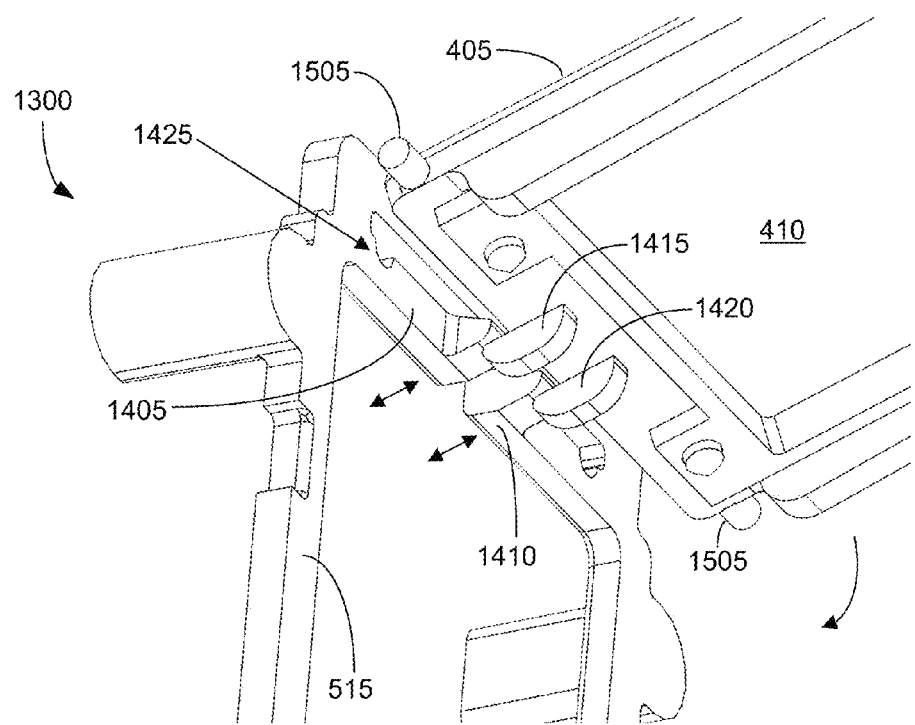
FIG. 13 illustrates another detailed perspective view of the hinge feature according to some inventive principles of this patent disclosure.

FIG. 13 illustrates another detailed perspective view of the hinge feature associated with region 1300 of FIG. 11, according to some inventive principles of this patent disclosure. Here, the frame 420 is removed to provide a clearer view. As can be seen, the mating elements 1405/1410 are structured to flex as indicated by the double-sided arrows when the curved projections 1415/1420 engage the respective mating elements. When the paddle 405 is opened or closed, the pins 1505 provide a pivot so that the paddle 405 can be rotated and the mating elements flexed.

Alternatively, one of the projections 1415/1420 or the mating elements 1405/1410 may be structured to flex the other of the projections 1415/1420 or the mating elements 1405/1410 responsive to a user positioning the paddle towards the open position. Or, one of the projections 1415/1420 or the mating elements 1405/1410 may be structured to flex the other of the projections 1415/1420 or the mating elements 1405/1410 inwardly towards the base unit responsive to a user applying pressure to release and close the paddle.

Figure 14:
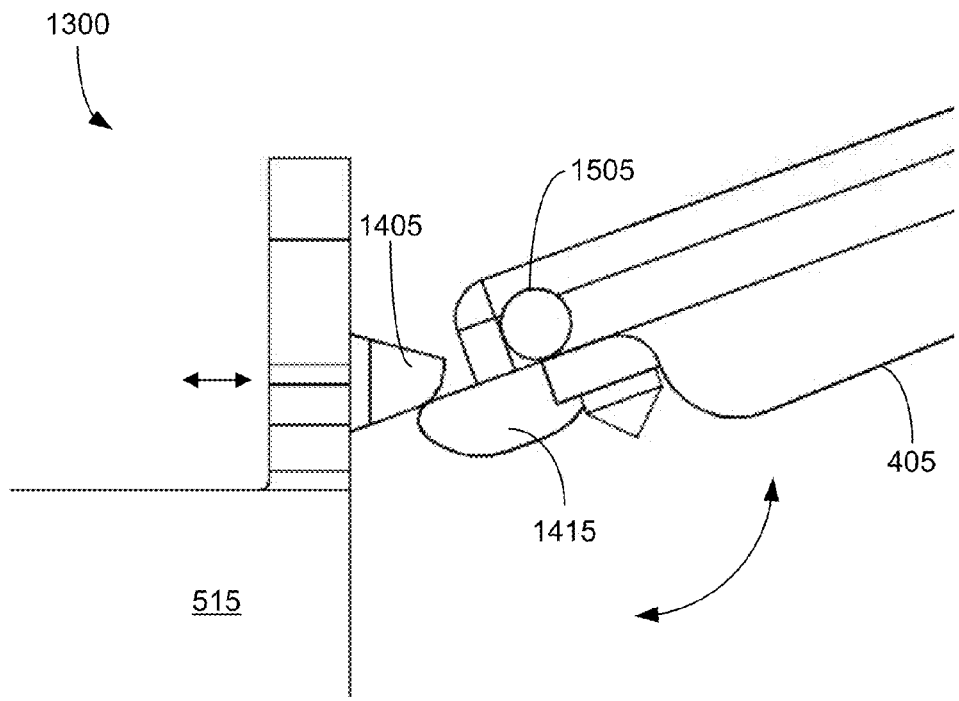
FIG. 14 illustrates a side elevation view of the hinge feature when the paddle is in the open position.
Figure 15:
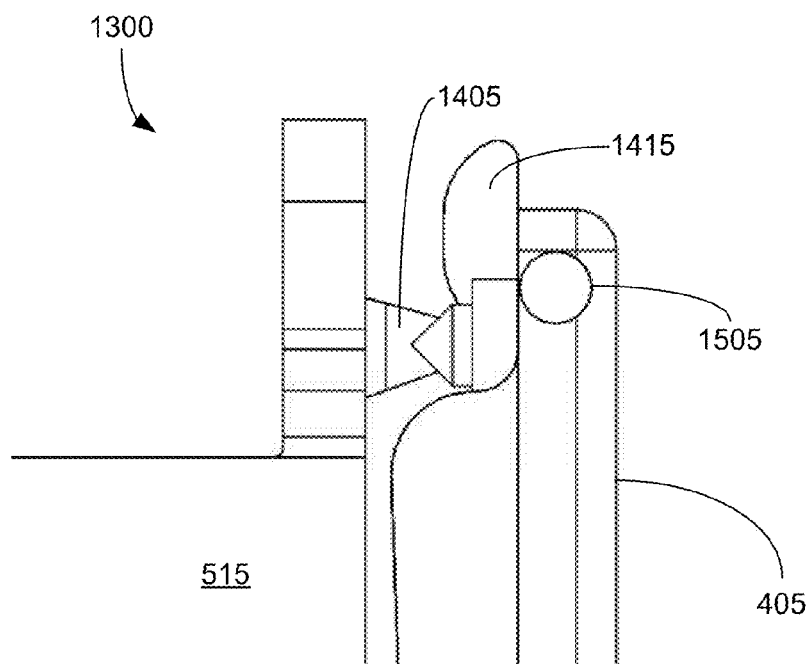
FIG. 15 illustrates a side elevation view of the hinge feature when the paddle is in the closed position.

FIG. 14 illustrates a side elevation view of the hinge feature associated with region 1300 of FIG. 11 when the paddle 405 is in the open position. FIG. 15 illustrates a side elevation view of the hinge feature associated with region 1300 of FIG. 11 when the paddle 405 is in the closed position. Here, as in FIG. 13, the frame 420 is removed to provide a clearer view. Referring to FIG. 14, the mating element 1405 automatically holds, or otherwise maintains the paddle 405 in the open position. Referring to FIG. 15, the paddle 405 is released and in the closed position. The term "automatically holds" or "maintains" as used herein describes a feature related to automatically holding the paddle in a location without manual pressure, thereby countering the effects of gravity, and providing convenient access to the user interface panel 510 (of FIG. 3). Rotating the paddle 405 may cause the mating element 1405 to temporarily flex inward, and then outward, as the curved projection 1415 engages and then disengages with the mating element 1405.

Figure 16:
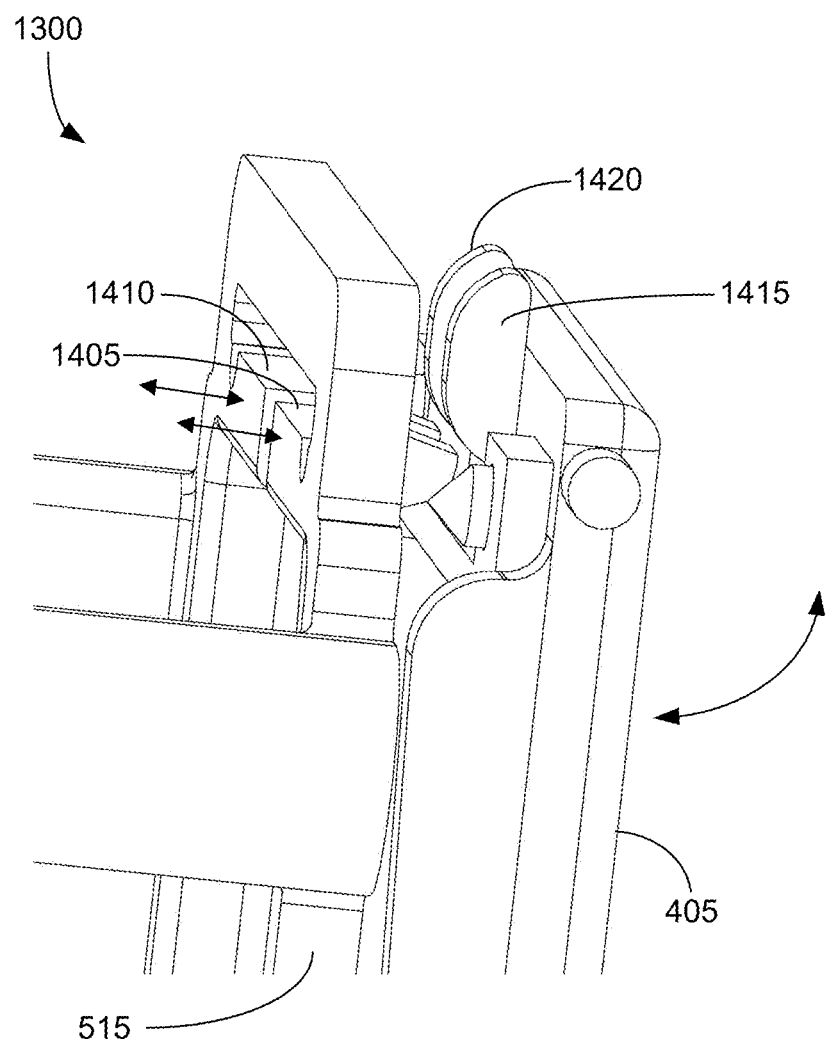
FIG. 16 illustrates a detailed perspective view of the hinge feature when the paddle is in the closed position.

FIG. 16 illustrates a detailed perspective view of the hinge feature associated with region 1300 of FIG. 11 when the paddle 405 is in the closed position. For the sake of brevity, a detailed description of FIG. 16 will be omitted because the illustrated elements essentially correspond to elements described above.

Figure 17:
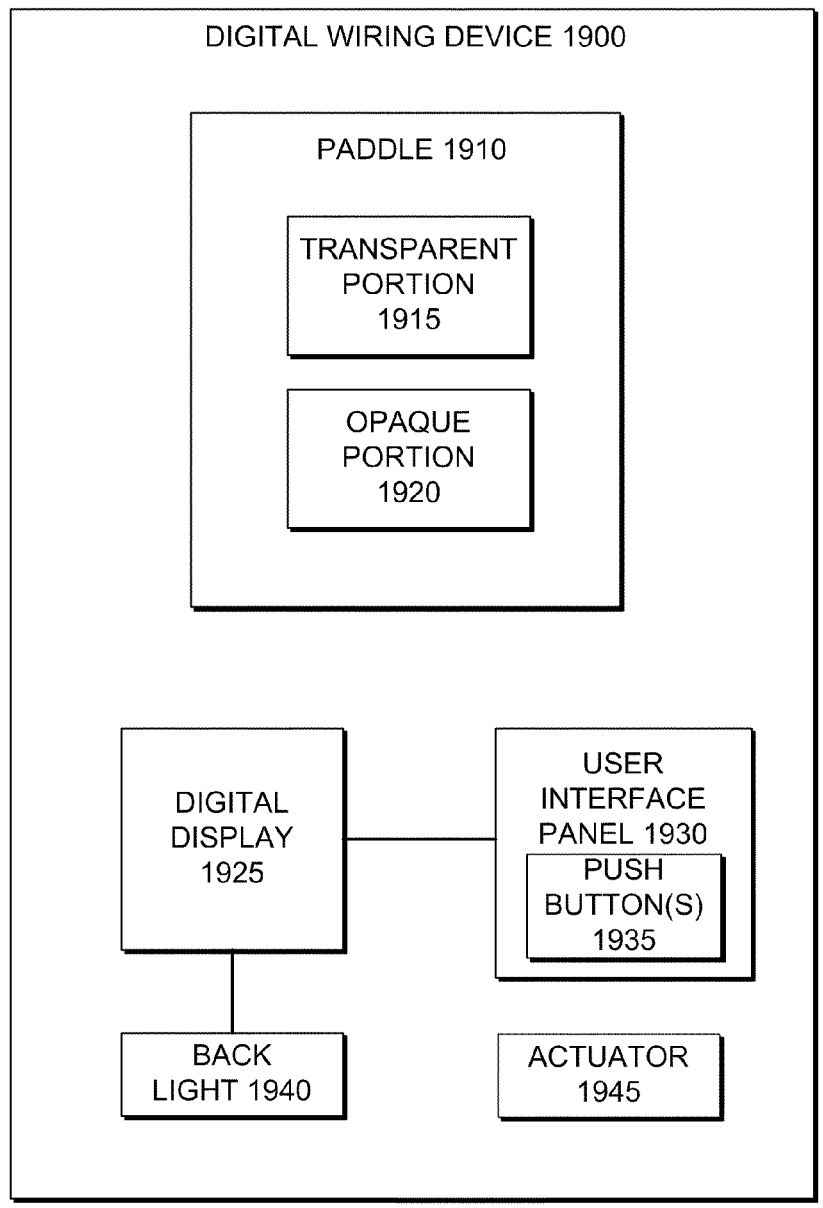
FIG. 17 is a block diagram of an in-wall digital wiring device according to some inventive principles of this patent disclosure.

FIG. 17 is a block diagram of an in-wall digital wiring device 1900 according to some inventive principles of this patent disclosure. The digital wiring device 1900 may include a paddle 1910 having the transparent portion 1915 and the opaque portion 1920, which can be similar to those described above. The digital wiring device 1900 can also include the digital display 1925 and the user interface panel 1930. The user interface panel 1930 can include one or more push buttons 1935, actuators, or other suitable user input interfaces. The digital wiring device 1900 may also include a back light 1940, which may be activated to illuminate at least a portion of the digital display 1925.

The push buttons 1935 may be operatively associated with the back light 1940. In addition, the paddle 1910 may be operatively associated with the back light 1940. For example, the back light 1940 can be activated to illuminate at least a portion of the digital display 1925 responsive to any one of a press of the paddle 1910, a press of the one or more push buttons 1935, or a lift of the paddle 1910 to an open position. For example, when the paddle 1910 is in the closed position, and the paddle 1910 is pressed inwardly toward the digital wiring device 1900 by the user, the actuator 1945 may receive a back surface of the paddle 1910, thereby actuating the actuator 1945 and energizing the back light 1940 so that the digital display 1925 is visible through a window of the paddle 1910. Alternatively, or in addition to, the back light 1940 can be activated to illuminate at least a portion of the digital display 1925 responsive to the user opening the paddle, or pressing the one or more push buttons 1935.

The paddle 1910 may be moved by pressing the paddle 1910 from a closed at-rest position to a momentary pressed position. Alternatively, the paddle 1910 may be lifted from the closed position. In another embodiment, the paddle 1910 may be moved from the closed position to an open and maintained position. In yet another embodiment, the paddle 1910 may be moved from the open and maintained position to the closed position.

In any of these scenarios, at least a portion of the digital display 1925 can be revealed, or the back light 1940 can illuminate at least a portion of the digital display 1925, responsive to the movement of the paddle 1910.

Figure 18:
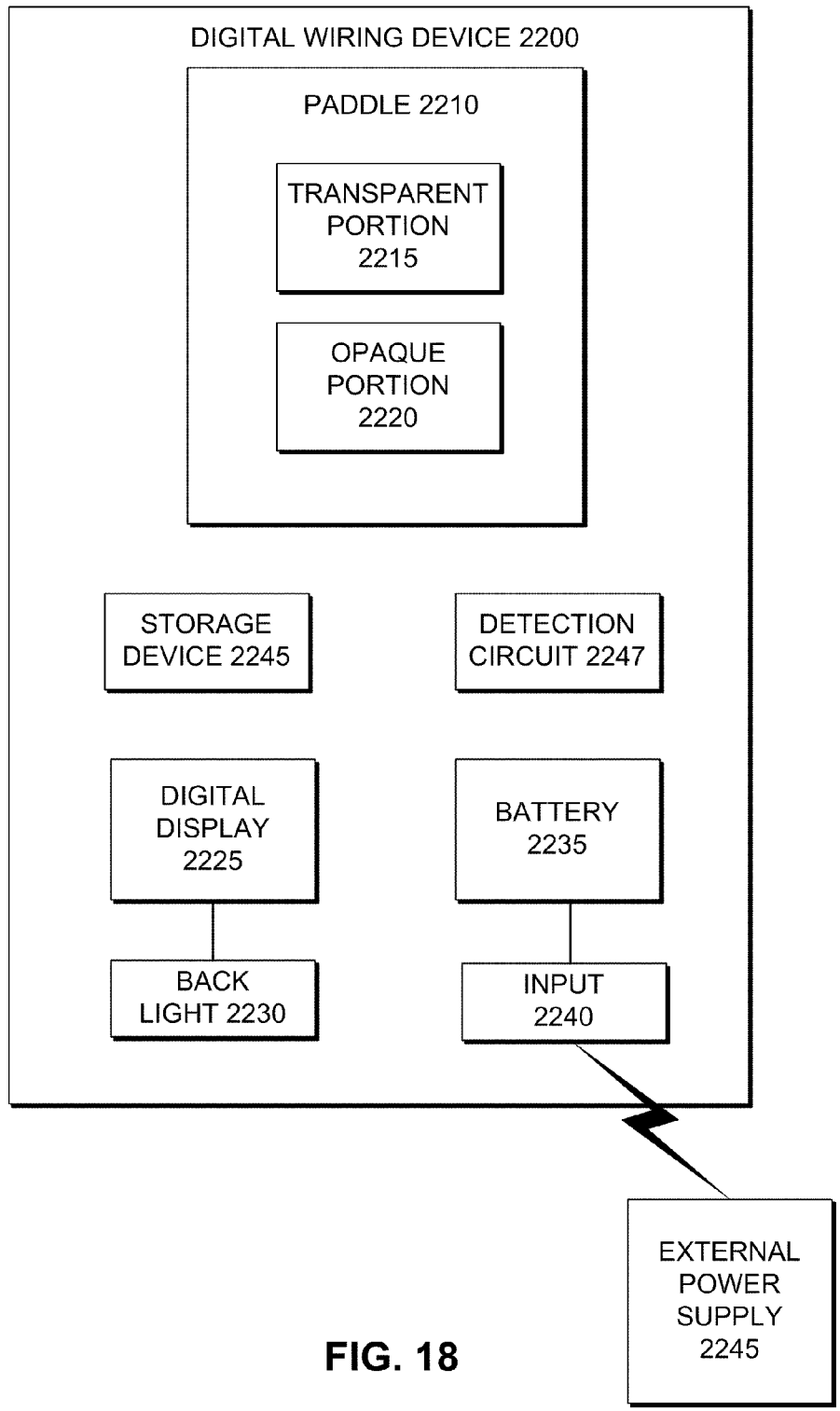
FIG. 18 is a block diagram of an in-wall digital wiring device according to some inventive principles of this patent disclosure.

FIG. 18 is a block diagram of an in-wall digital wiring device 2200 according to some inventive principles of this patent disclosure. The digital wiring device 2200 may include a paddle 2210 having the transparent portion 2215 and opaque portion 2220, essentially as described above. In addition, the digital wiring device 2200 includes the digital display 2225 and the back light 2230. Moreover, the digital wiring device 2200 includes an input 2240 to receive a electrical power from an external power supply 2245 to power the digital wiring device 2200 in a normal power mode. A detection circuit 2247 is configured to detect a power loss of the electrical power supply 2245. A battery 2235 is included in the digital wiring device 2200 to provide electrical power to the input 2240 to power the digital wiring device 2200 in a battery backup mode based on the detection of power loss or other interruption of the electrical power from the external supply 2245. The back light 2230 is configured to illuminate at least a portion of the digital display 2225 based on the mode.

For example, the back light 2230 can be disabled when the digital wiring device is in the battery backup mode. Conversely, the back light 2230 can be enabled when the digital wiring device is in the normal power mode. Otherwise, if the back light 2230 were left on during the battery backup mode, there would be a greater likelihood of the digital wiring device 2200 losing data stored in one or more storage devices, such as storage device 2245. Storage device 2245 can be any memory storage device, optical storage device, magnetic storage device, or any other suitable device capable of storing configuration data. In short, the digital wiring device 2200 may prevent the back light 2230 from illuminating the digital display 2225 when the digital wiring device 2200 is in the battery backup mode. When the digital wiring device 2200 is in the normal power mode, the digital display can be illuminated responsive to an action taken by the user, as previously described.

Figure 19:
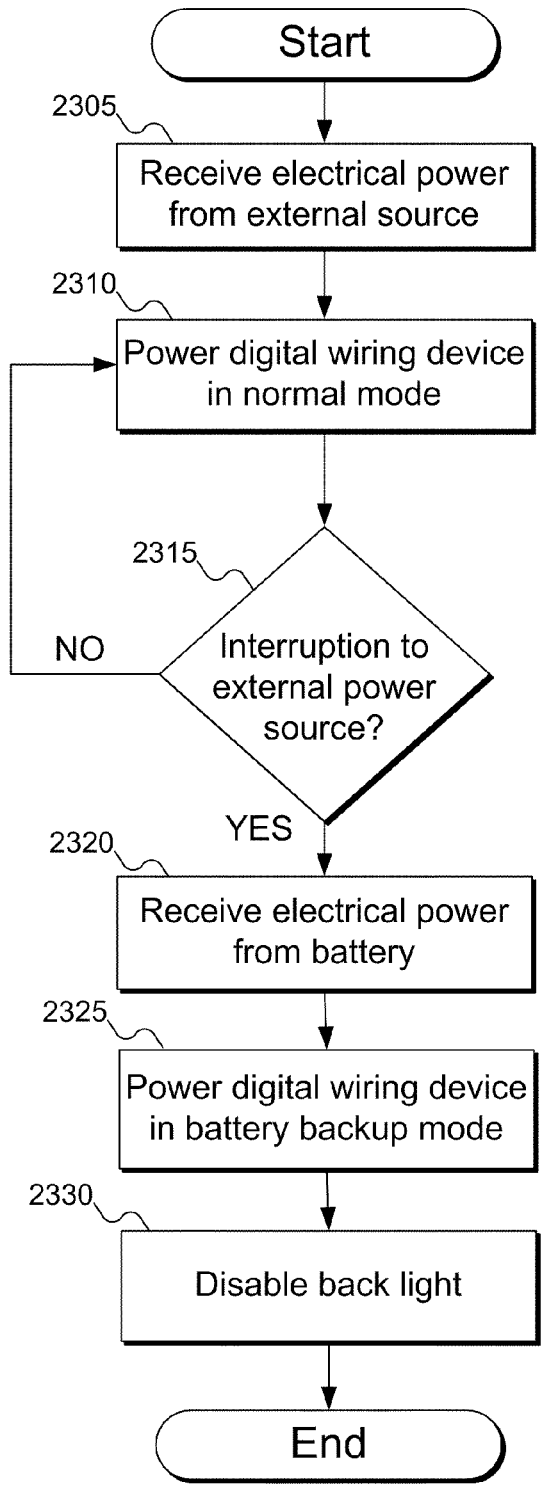
FIG. 19 is a flow diagram illustrating an embodiment of a technique for providing a battery backup mode for the digital wiring device of FIG. 18.

FIG. 19 is a flow diagram illustrating an embodiment of a technique for providing a battery backup mode for the digital wiring device of FIG. 18. At 2305, electrical power is received from a source external to the digital wiring device. At 2310, the digital wiring device is powered in the normal power mode using the electrical power from the external source. A determination is made at 2315 whether an interruption has been introduced to the electrical power from the external power source. If such an interruption is not detected, the flow continues to 2310. Otherwise, the flow proceeds to 2320 and the digital wiring device receives electrical power from the battery, and is powered in the battery backup mode at 2325. Once in the batter backup mode, the back light is disabled at 2330.

Figure 20:
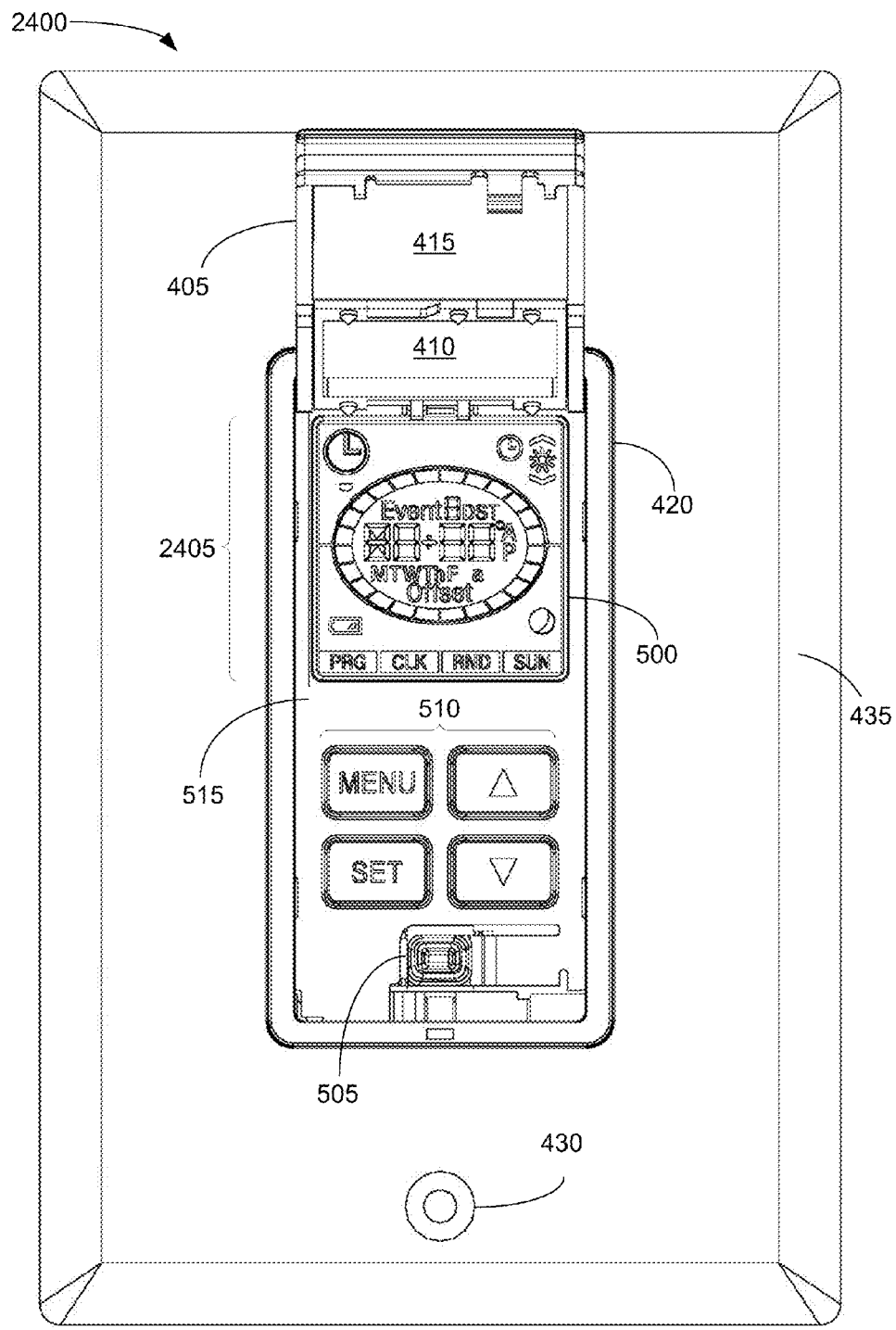
FIG. 20 illustrates a front elevation view of a digital wiring device including a digital display when a paddle is in an open position according to some inventive principles of this patent disclosure.

FIG. 20 illustrates a front elevation view of a digital wiring device 2400, including a digital display 500 displaying information 2405, when a paddle 405 is in an open position according to some inventive principles of this patent disclosure. The information 2405 includes an example of some information that can be conveyed to the user. A more detailed description of additional information is provided below.

Figure 21:
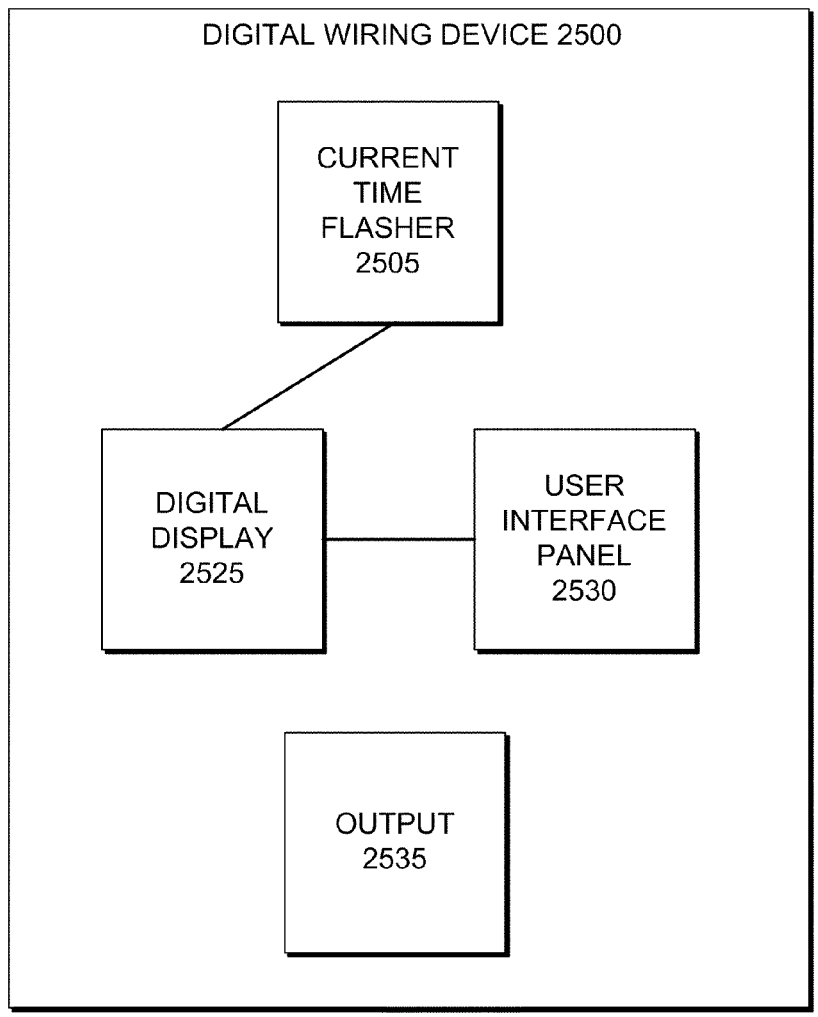
FIG. 21 is a block diagram of an in-wall digital wiring device according to some inventive principles of this patent disclosure.

FIG. 21 is a block diagram of an in-wall digital wiring device 2500 according to some inventive principles of this patent disclosure. The digital wiring device 2500 includes the digital display 2525 and user interface panel 2530, essentially as described above. In addition, the digital wiring device 2500 includes an output 2535, and a current-time flasher 2505 to change one or more icons of the digital display 2525 from a first state to a second state, and from the second state to the first state, at a predefined rate.

Figure 22:
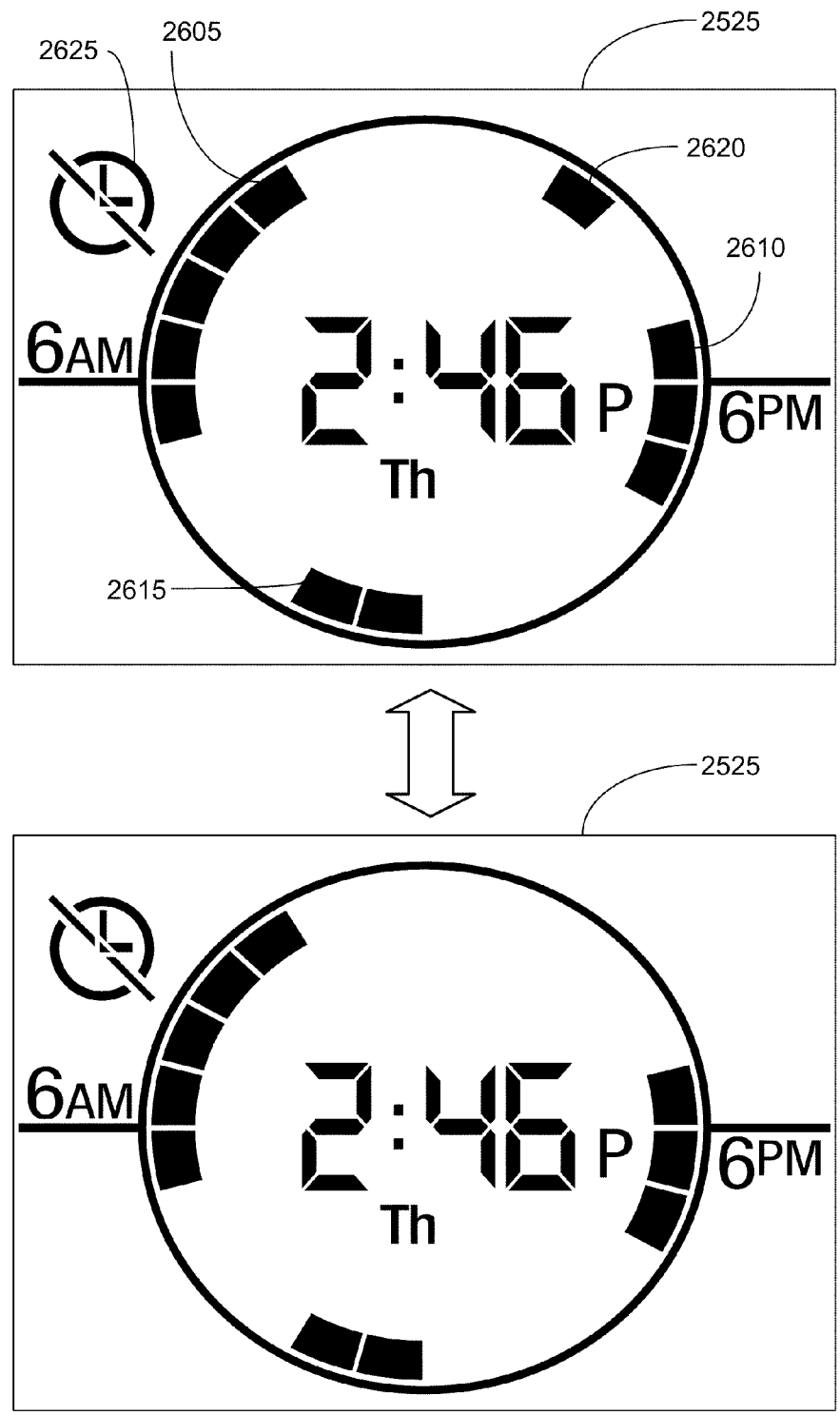
FIG. 22 illustrates a digital display associated with a normal timing mode.

FIG. 22 illustrates a digital display 2525 associated with a normal timing mode. The normal timing mode provides a "schedule-at-a-glance" so that the user may quickly assess when an event is scheduled. The "schedule-at-a-glance" is herein defined by the following descriptions and examples, any combination of which can form the "schedule-at-a-glance." For example, the digital display 2525 may include icons, such as icons 2605, 2610, 2615, and 2620, circumferentially disposed in a substantially circular, curved, oval shaped, elliptical, or any other suitable pattern. The icons 2605, 2610, 2615, and 2620 correspond to information provided on the digital display 2525 to show a cyclical schedule, or in other words, a schedule of at least one time cycle or cycle duration. The digital display 2525 is capable of outputting a representation of the time cycle or cycle duration. Each icon corresponds to a time of day, such as one hour of a day, one half-hour of a day, or any other time increment. Any number of icons, for example twenty-four, can be displayed at any given time. The representation of the time cycle comprises the schedule-at-a-glance, which can include a complete or partial duration of the time cycle. One of the icons, such as icon 2620, may have an animated appearance. The animated appearance can be an indicator to the user that this icon corresponds to a specific point in the cycle, for example, the current time. This is illustrated in FIG. 22 by the double-sided arrow between the two phases of the digital display 2525, which shows that icon 2620 is present (i.e., on) for a time, and then not present (i.e., off) for another time. In other words, the current-time flasher 2505 can flash the icon 2620 at a predefined rate, for example about once per second. This indicates to the user that the specific point in the cycle represented by icon 2620, in this case the hour between about 2 p.m. and 3 p.m., corresponds to the current time.

Further, icons 2605 indicate to the user that an event is scheduled for the later morning hours; icons 2610 indicate to the user that an event is scheduled for the evening hours; and icons 2615 indicate to the user that an event is scheduled for the earlier morning hours. The term "event," as used herein, refers to a scheduled entry associated with enabling of the output 2535 of the digital wiring device 2500. In other words, the output 2535 of the digital wiring device is on during the scheduled event, and off when no events are scheduled. To put it differently, each icon includes a first state indicating that the output 2535 of the digital wiring device 2500 is scheduled as on for the corresponding hour and a second state indicating that the output 2535 of the digital wiring device 2500 is scheduled as off for the corresponding hour.

At approximately the center of the digital display 2525, the current time, such as "2:46 P" is displayed. The current abbreviated day, such as "Th" may be displayed below the current time. Towards the left of the digital display 2525, an indicator such as "6 AM" can provide the user with a convenient marker to enhance the meaning of the icons 2605, 2620, 2610, and 2615. For example, the user can quickly assess that "6 AM" corresponds to mid-morning, and that the icons 2605 indicate that an event is scheduled around mid-morning. Similarly, towards the right of the digital display 2525, an indicator such as "6 PM" can be used. Alternatively, or in addition to, an indicator such as "12 AM" can be displayed toward the bottom of the digital display 2525, and an indicator such as "12 PM" can be displayed toward the top of the digital display 2525.

Figure 23:
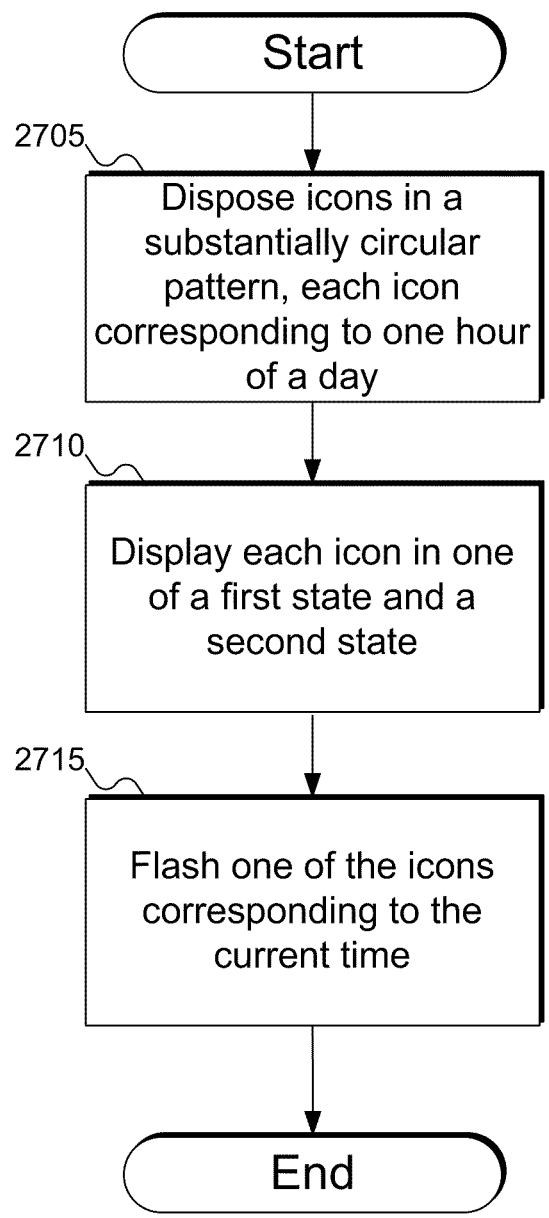
FIG. 23 is a flow diagram illustrating an embodiment of a technique for displaying a schedule-at-a-glance.

FIG. 23 is a flow diagram illustrating an embodiment of a technique for displaying a schedule-at-a-glance. At 2705, icons are disposed in a substantially circular, curved, or other suitable pattern on a display of a digital wiring device, each icon corresponding to a time increment, such as one hour of a day. Each icon is displayed at 2710 in one of a first state and a second state. At about the same time, one of the icons corresponding to the current time is flashed at 2715.

Figure 24:
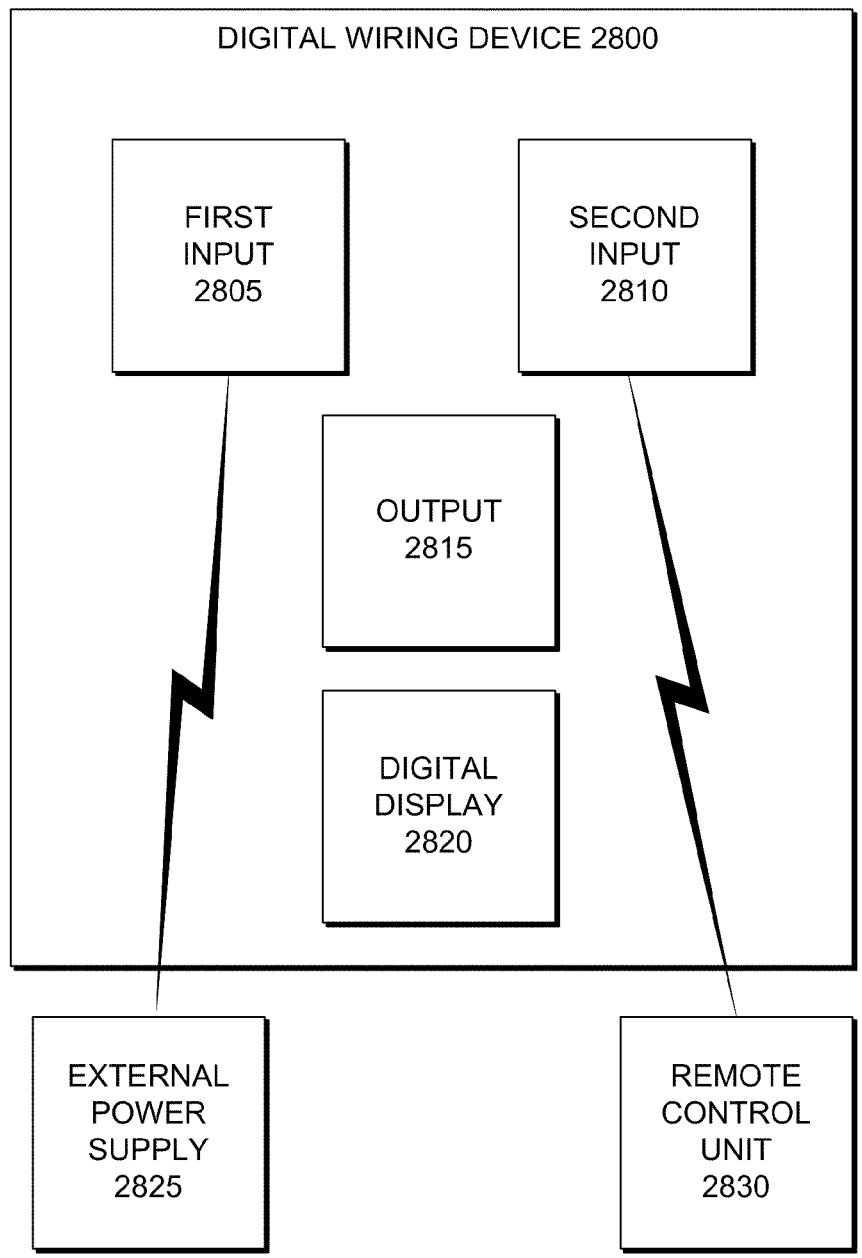
FIG. 24 is a block diagram of an in-wall digital wiring device according to some inventive principles of this patent disclosure.

FIG. 24 is a block diagram of an in-wall digital wiring device 2800 according to some inventive principles of this patent disclosure. The digital wiring device 2800 may include an output 2815 and a digital display 2820. During a normal timing mode, the output 2815 of the digital wiring device 2800 is on when an event is active and off when an event is not active. The digital wiring device 2800 may include a first input 2805 to receive a electrical power from an external power supply 2825 for powering the digital wiring device 2800. In addition, the digital wiring device 2800 may include a second input 2810 to receive one or more messages, such as an override signal, from a remote control unit 2830. The remote control unit 2830 can transmit one or more messages to the digital wiring device 2800 to the second input 2810 to override one or more functions of the digital wiring device. The one or more messages can be associated with a temporary-on mode, a temporary-off mode, a permanent-on mode, a permanent-off mode, or a normal timing mode.

Figure 25:
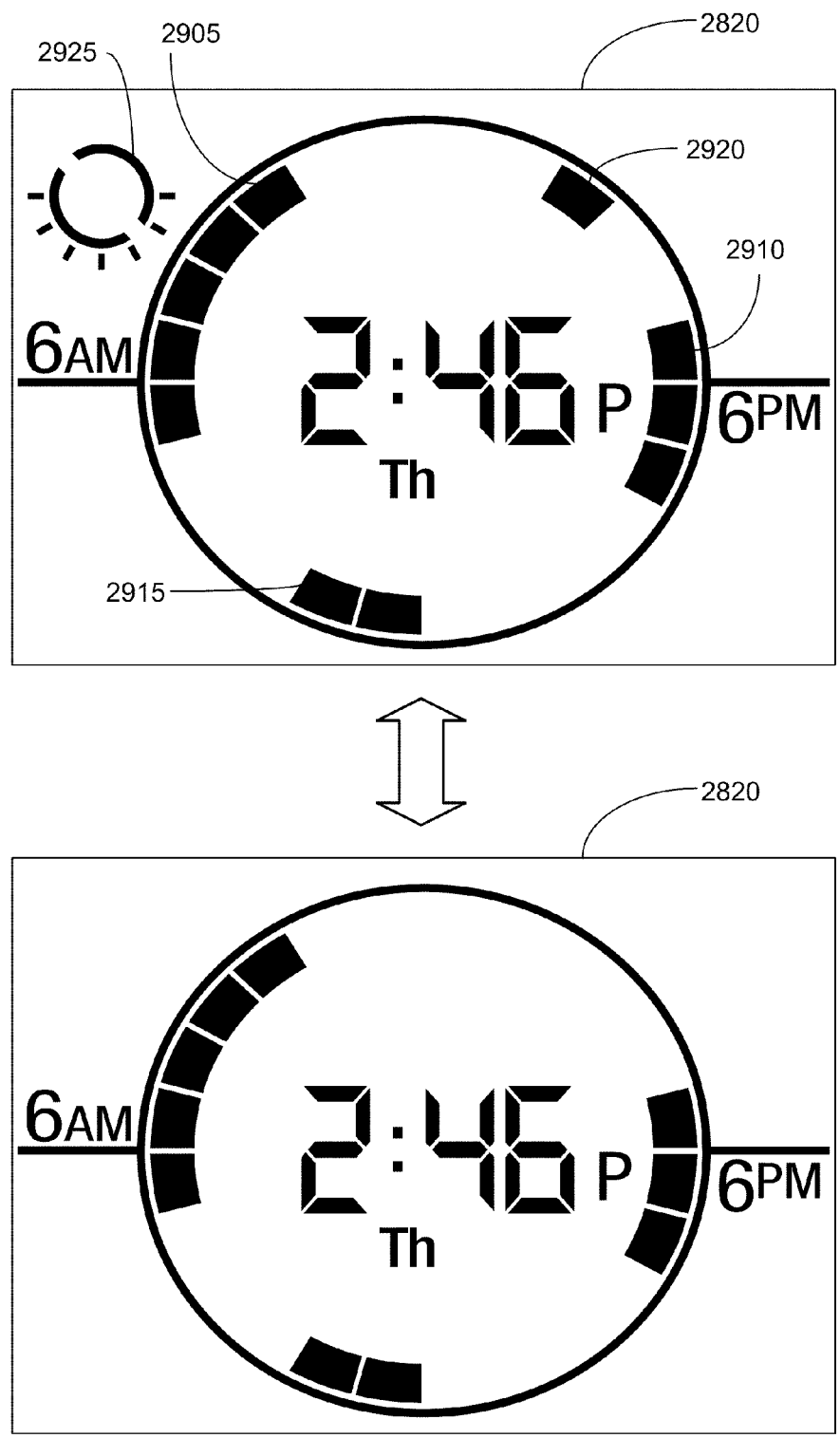
FIG. 25 illustrates a digital display associated with a temporary-on mode.

FIG. 25 illustrates a digital display 2820 associated with the temporary-on mode. The temporary-on mode corresponds to a mode in which the output 2815 of the digital wiring device 2800 is on independent of any scheduled events until a next scheduled event. An icon, such as icon 2925, may indicate to the user that the present mode is the temporary-on mode. For example, the icon 2925 may flash. This is illustrated in FIG. 25 by the double-sided arrow between the two phases of the digital display 2820, which shows that icon 2925 is present (i.e., on) for a time, and then not present (i.e., off) for another time. The remaining icons related to events and other timing information generally correspond to those previously described above with reference to FIG. 22.

Figure 26:
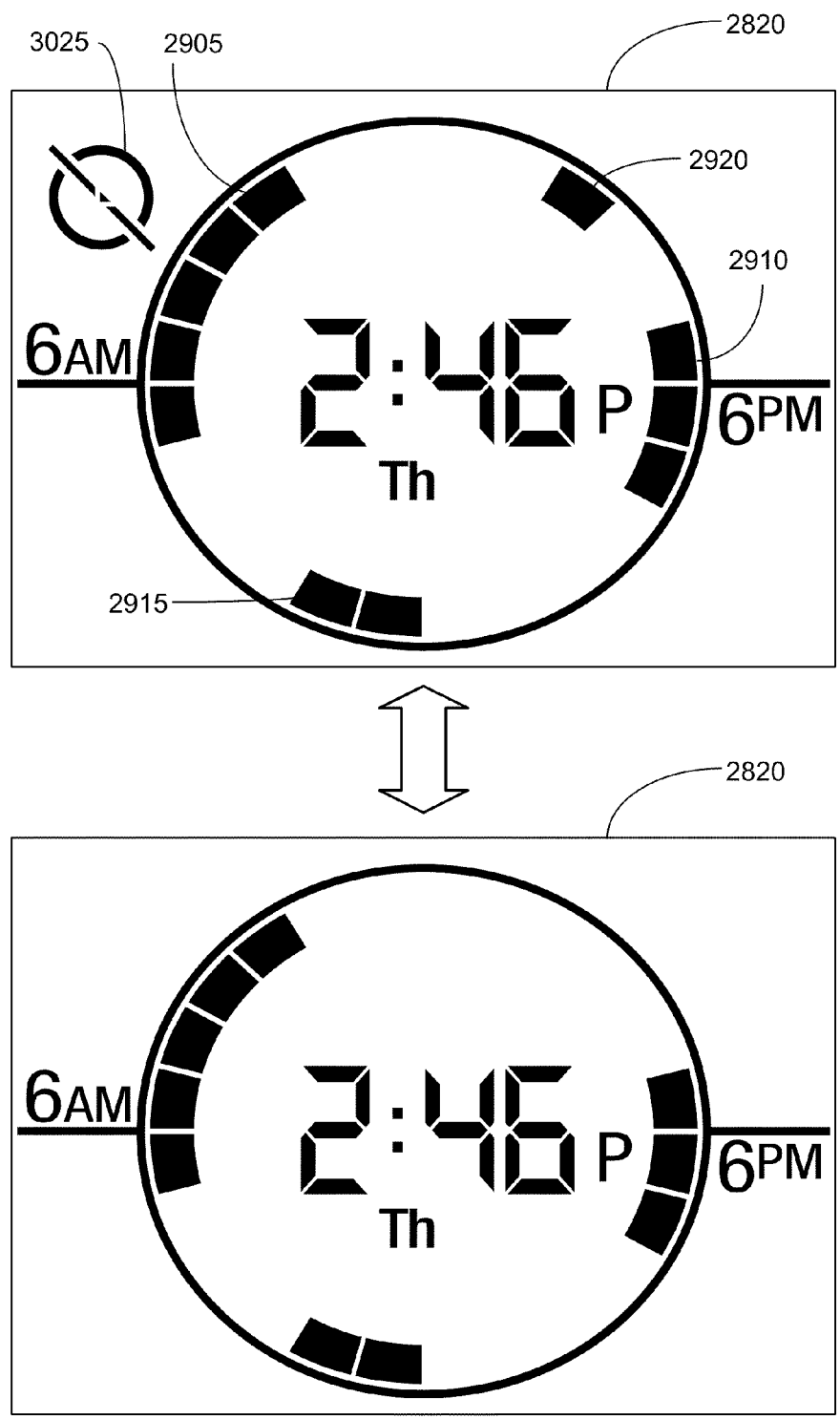
FIG. 26 illustrates a digital display associated with a temporary-off mode.

FIG. 26 illustrates a digital display 2820 associated with the temporary-off mode. The temporary-off mode corresponds to a mode in which the output 2815 of the digital wiring device 2800 is off independent of any scheduled events until the next scheduled event. An icon, such as icon 3025, may indicate to the user that the present mode is the temporary-off mode. For example, the icon 3025 may flash. This is illustrated in FIG. 26 by the double-sided arrow between the two phases of the digital display 2820, which shows that icon 3025 is present (i.e., on) for a time, and then not present (i.e., off) for another time. The remaining icons related to events and other timing information generally correspond to those previously described above with reference to FIG. 22.

Figure 27:
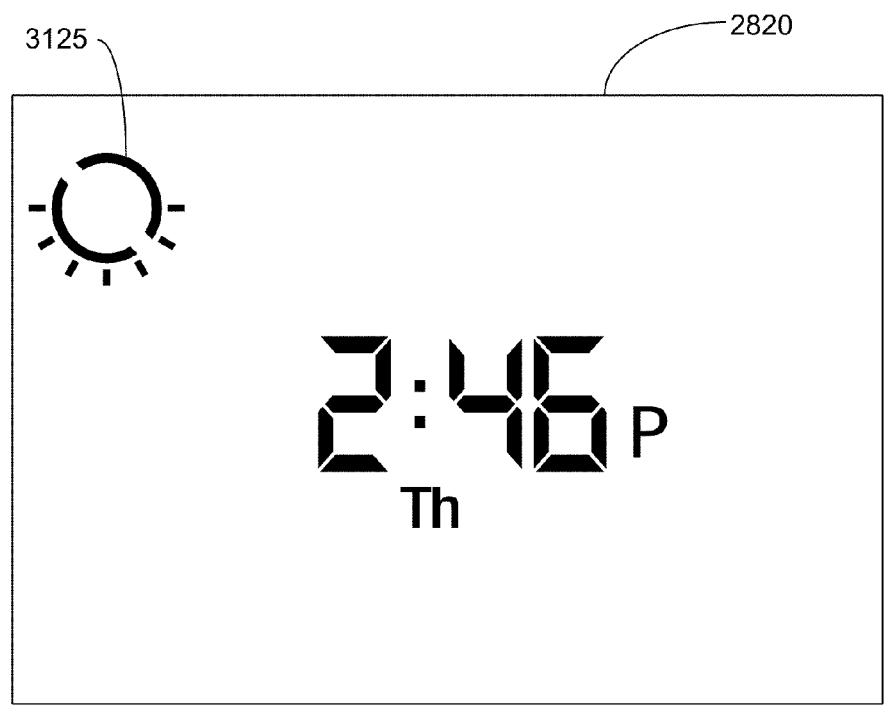
FIG. 27 illustrates a digital display associated with a permanent-on mode.

FIG. 27 illustrates a digital display 2820 associated with the permanent-on mode. The permanent-on mode corresponds to a mode in which the output 2815 of the digital wiring device 2800 is on independent of any scheduled events and independent of a current time. For this reason, the icons associated with scheduled events need not be present. An icon, such as icon 3125, may indicate to the user that the present mode is the permanent-on mode. The icon 3125 does not flash, but rather, is constantly on to represent the permanent-on mode. At approximately the center of the digital display 2820, the current time, such as "2:46 P" may be displayed. The current abbreviated day, such as "Th" may be displayed below the current time.

Figure 28:
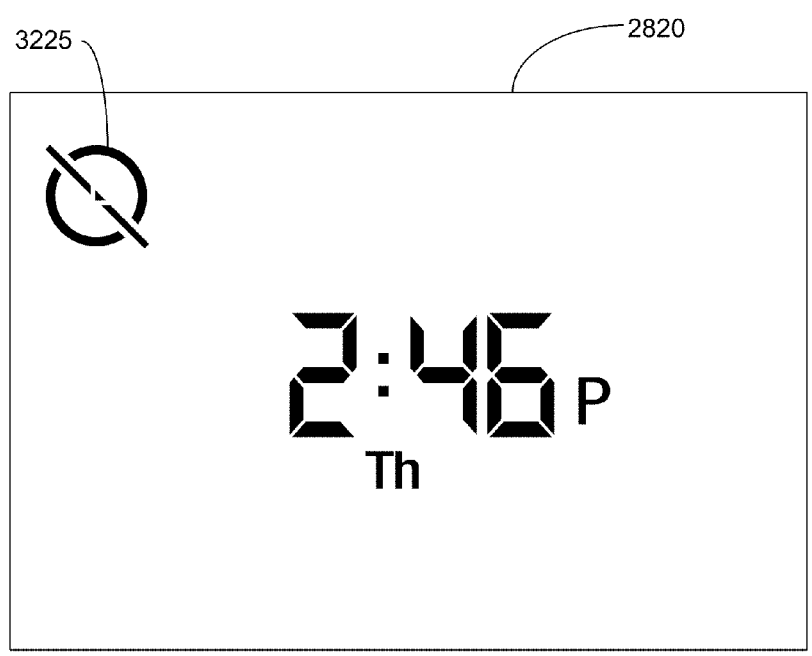
FIG. 28 illustrates a digital display associated with a permanent-off mode.

FIG. 28 illustrates a digital display 2820 associated with a permanent-off mode. The permanent-off mode corresponds to a mode in which the output 2815 of the digital wiring device 2800 is off independent of any scheduled events and independent of a current time. For this reason, the icons associated with scheduled events need not be present. An icon, such as icon 3225, may indicate to the user that the present mode is the permanent-off mode. The icon 3225 does not flash, but rather, is constantly on to represent the permanent-off mode. At approximately the center of the digital display 2820, the current time, such as "2:46 P" may be displayed. The current abbreviated day, such as "Th" may be displayed below the current time.

Figure 29:
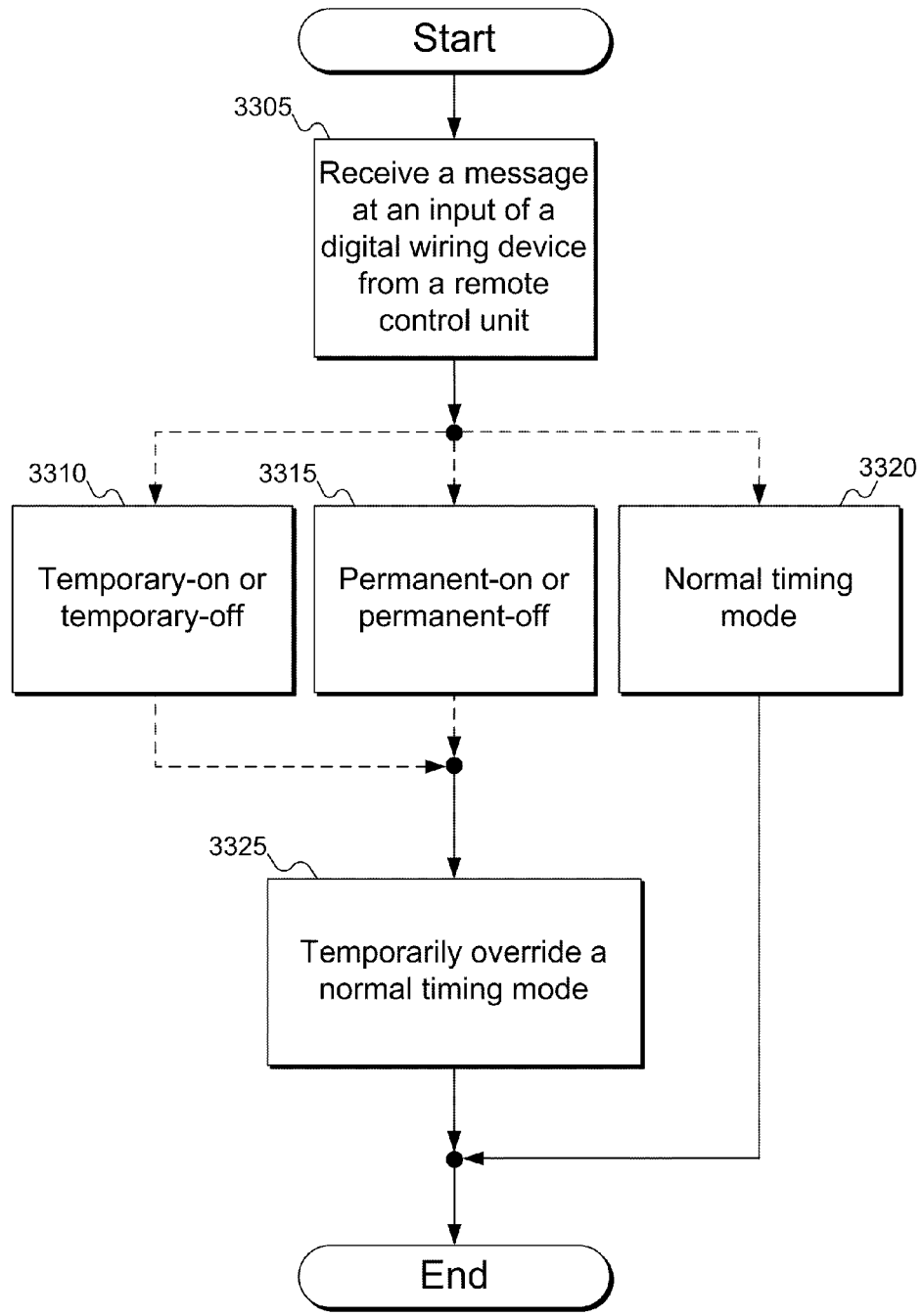
FIG. 29 is a flow diagram illustrating an embodiment of a technique for temporarily overriding a normal timing mode using a remote control unit.

FIG. 29 is a flow diagram illustrating an embodiment of a technique for temporarily overriding a normal timing mode using a remote control unit. At 3305, a message may be received at an input (e.g., 2810 of FIG. 24) of a digital wiring device (e.g., 2800) from a remote control unit (e.g., 2830). Based on the type of message, the digital wiring device determines whether to temporarily override a normal timing mode. For example, as shown at 3310 and 3315, if the message corresponds to the temporary-on mode, temporary-off mode, permanent-on mode, or permanent-off mode, the flow proceeds to 3325 where the normal timing mode is temporarily overridden. Otherwise, if message corresponds to the normal timing mode at 3320, the flow does not proceed to 3325 because a function is not overridden in the normal timing mode.

The technique may also include, during the temporary-on mode, enabling the output (e.g., 2815) of the digital wiring device (e.g., 2800) independent of any scheduled events until a next scheduled event; during the temporary-off mode, disabling the output (e.g., 2815) of the digital wiring device (e.g., 2800) independent of any scheduled events until the next scheduled event; during the permanent-on mode, enabling the output (e.g., 2815) of the digital wiring device (e.g., 2800) independent of any scheduled events and independent of the current time; and during the permanent-off mode, disabling the output (e.g., 2815) of the digital wiring device (e.g., 2800) independent of any scheduled events and independent of the current time.

Figure 30:
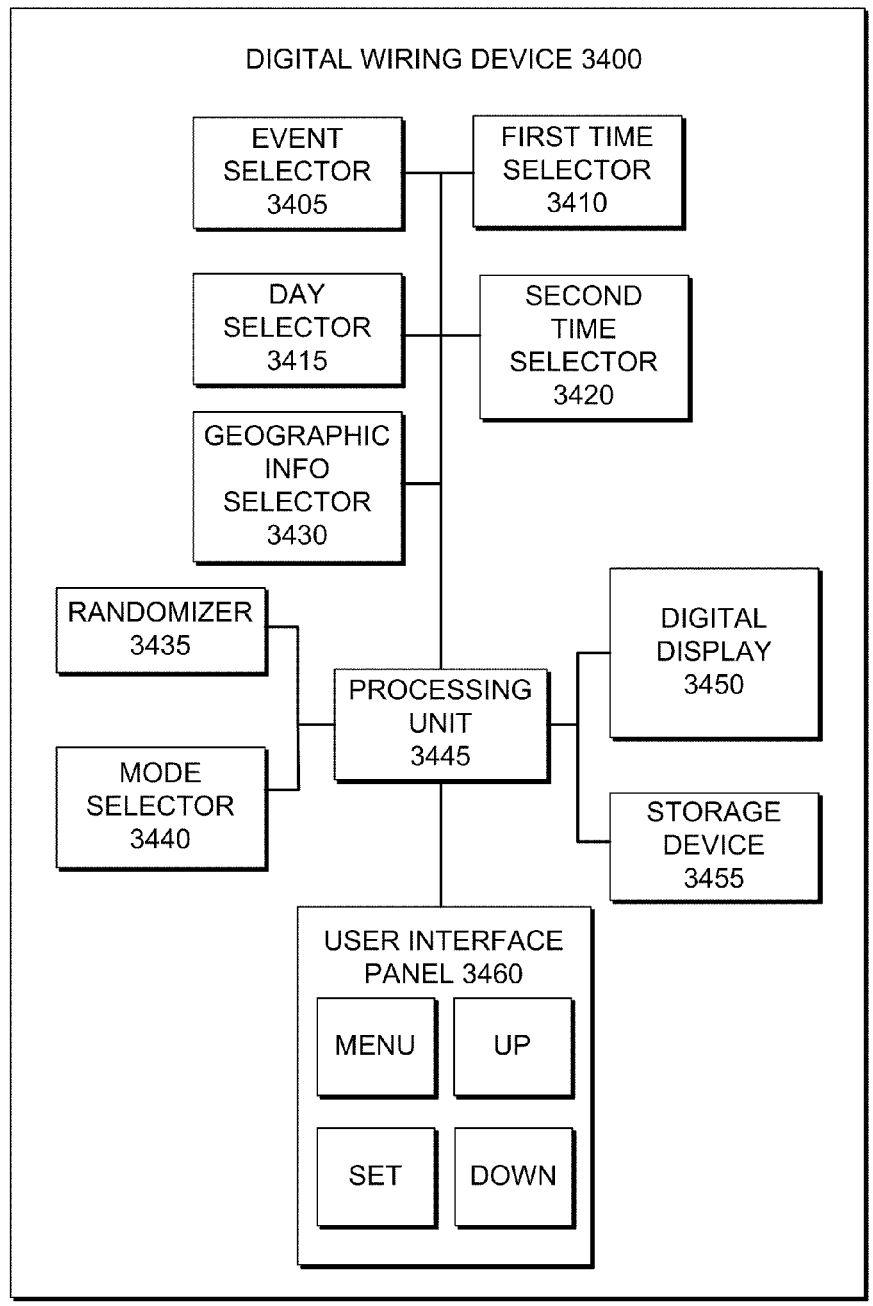
FIG. 30 is a block diagram of an in-wall digital wiring device according to some inventive principles of this patent disclosure.

FIG. 30 is a block diagram of an in-wall digital wiring device 3400 including a digital display 3450 according to some inventive principles of this patent disclosure. The digital wiring device 3400 includes an event selector 3405 to configure one or more events responsive to user input. The user input may be received using the push buttons of the user interface panel 3460, or other suitable user input interface. The digital wiring device 3400 includes a day selector 3415 to configure at least one day for the one or more events, a first time selector 3410 to configure an on-time for the one or more events, and a second time selector 3420 to configure an off-time for the one or more events, all responsive to different user input received by the digital wiring device 3400 using the user interface panel 3460. A processing unit 3445 may process the received information and a storage device 3455 may store the event number, the day, the on-time, and the off-time. The digital wiring device 3400 may also include a geographic information selector 3430 to configure geographic parameters responsive to user input, a randomizer 3435 to shift the on-time or the off-time by a predefined amount of time based on an aspect of the event, and a mode selector 3440 to configure a mode, as will be further described in detail below.

Figure 31:
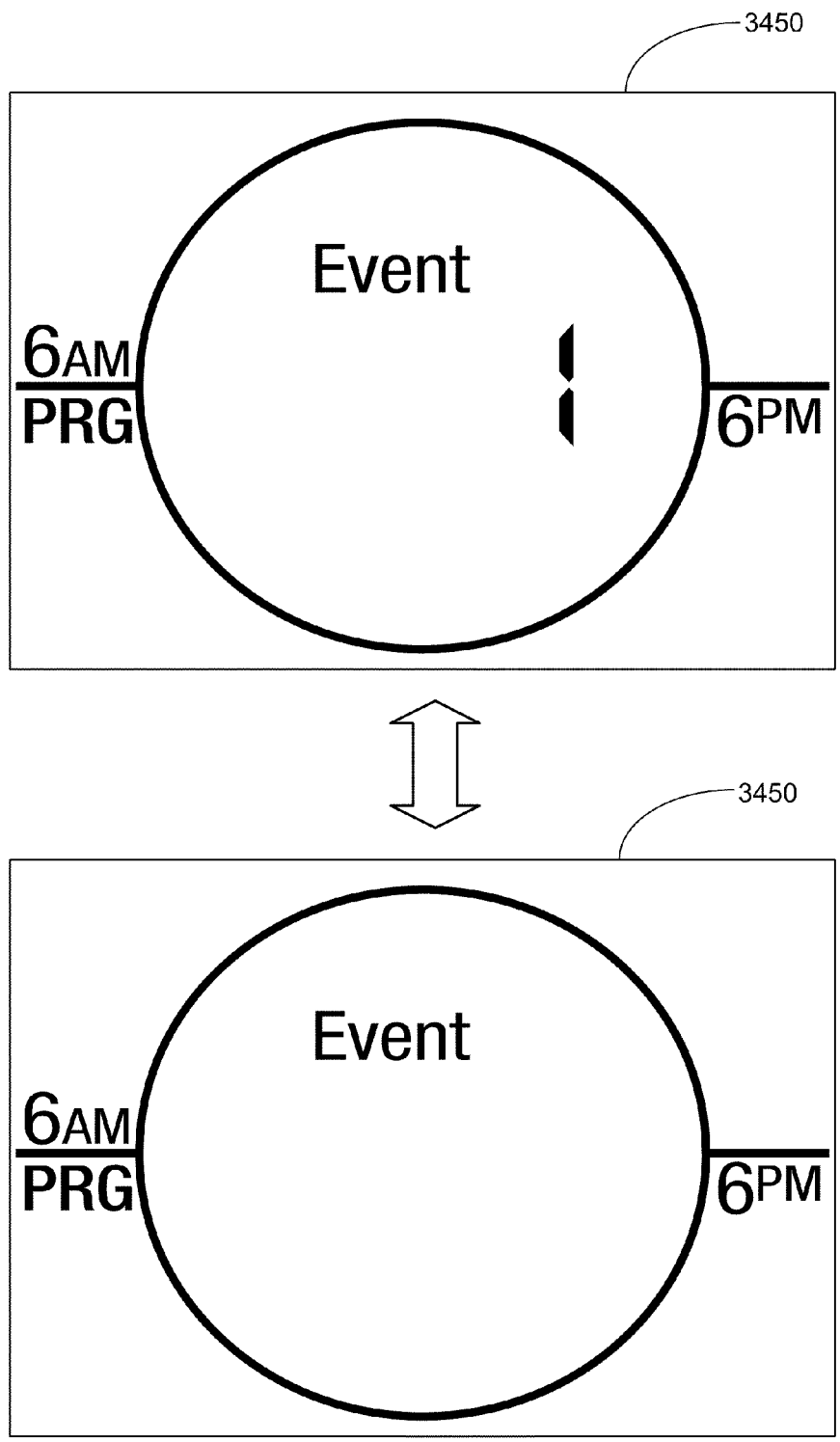
FIG. 31 illustrates a digital display associated with the selection of an event number according to some inventive principles of this patent disclosure.

FIG. 31 illustrates a digital display 3450 associated with the selection of an event number according to some inventive principles of this patent disclosure. The word "Event" is displayed on the digital display 3450 when the user is selecting an event number. An indicator, such as the abbreviated term "PRG" may also be displayed on the digital display 3450 so that the user is aware that a programming operation is underway. An integer corresponding to an event number under selection, such as event number "1" is displayed on the digital display 3450. If an event corresponding to the event number shown (in this case "1") is not yet scheduled, then the "schedule-at-a-glance" showing the icons in a substantially circular, curved, or other suitable pattern will not be displayed on the digital display 3450. However, the event number (in this case "1") will be displayed, for example, in a flashing state. This is illustrated in FIG. 31 by the double-sided arrow between the two phases of the digital display 3450, which shows that event number "1" is present (i.e., on) for a time, and then not present (i.e., off) for another time.

Figure 32:
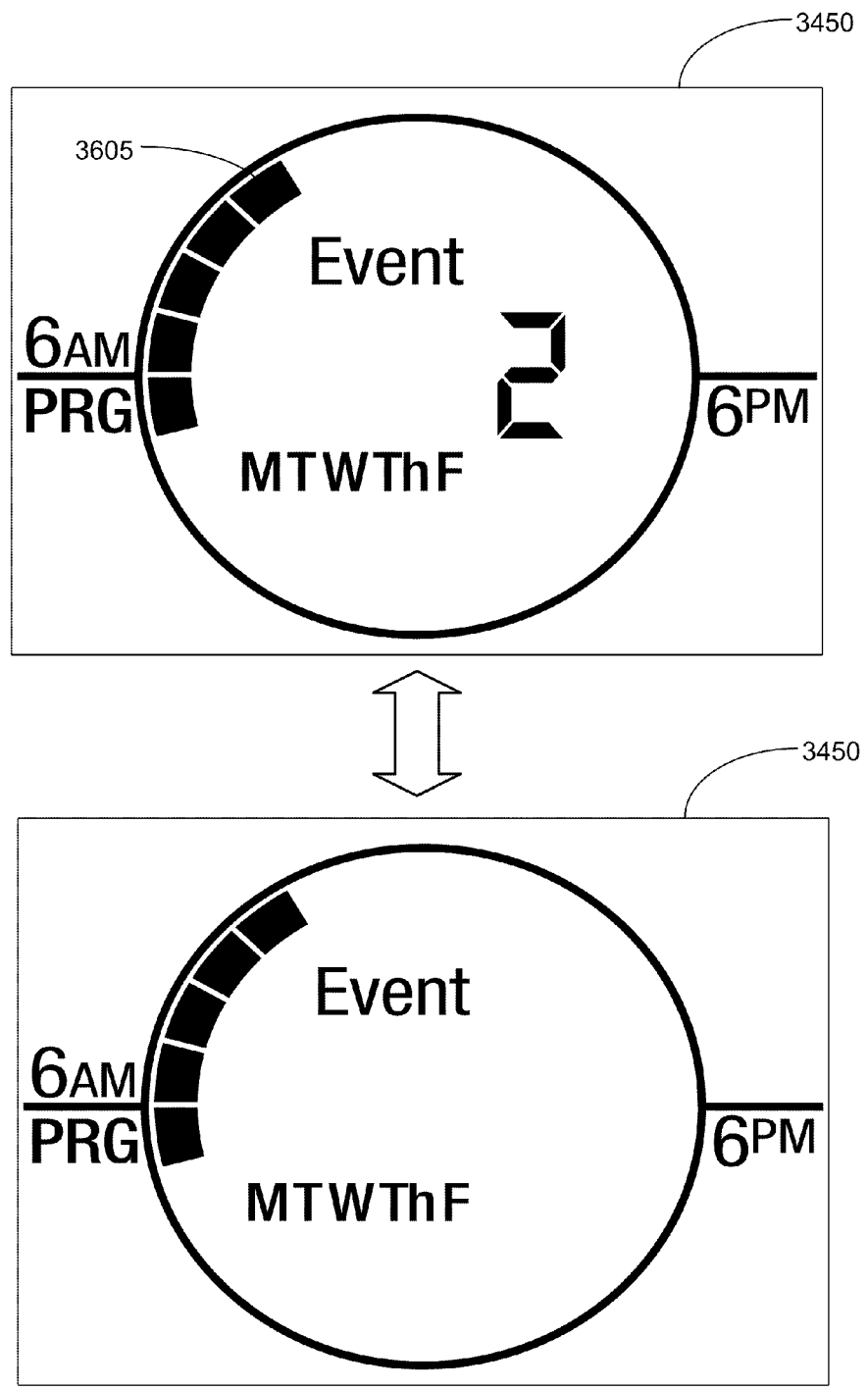
FIG. 32 illustrates a digital display associated with viewing a schedule related to an event number according to some inventive principles of this patent disclosure.

The user can quickly scroll through the events using the buttons of the user interface panel 3460 to see which events are scheduled and for when. For example, in FIG. 32 the digital display 3450 shows an integer "2" associated with event number 2 along with a schedule related to the event number 2. In other words, the event number 2 has associated therewith icons 3605, which indicate that the event number 2 is scheduled for five hours on the mornings of Monday, Tuesday, Wednesday, Thursday, and Friday, as also indicated by the abbreviated day indicators "M T W Th F." The event number 2 is displayed in a flashing state. This is illustrated in FIG. 32 by the double-sided arrow between the two phases of the digital display 3450, which shows that event number "2" is present (i.e., on) for a time, and then not present (i.e., off) for another time.

An "up" button of the user interface panel 3460 may be used to increment the flashing integer corresponding to the event number, and a "down" button may be used to decrement the flashing integer. A "set" button may be used to store the event number and other associated data corresponding to the flashing integer in the storage device 3455 of the digital wiring device 3400.

Figure 33:
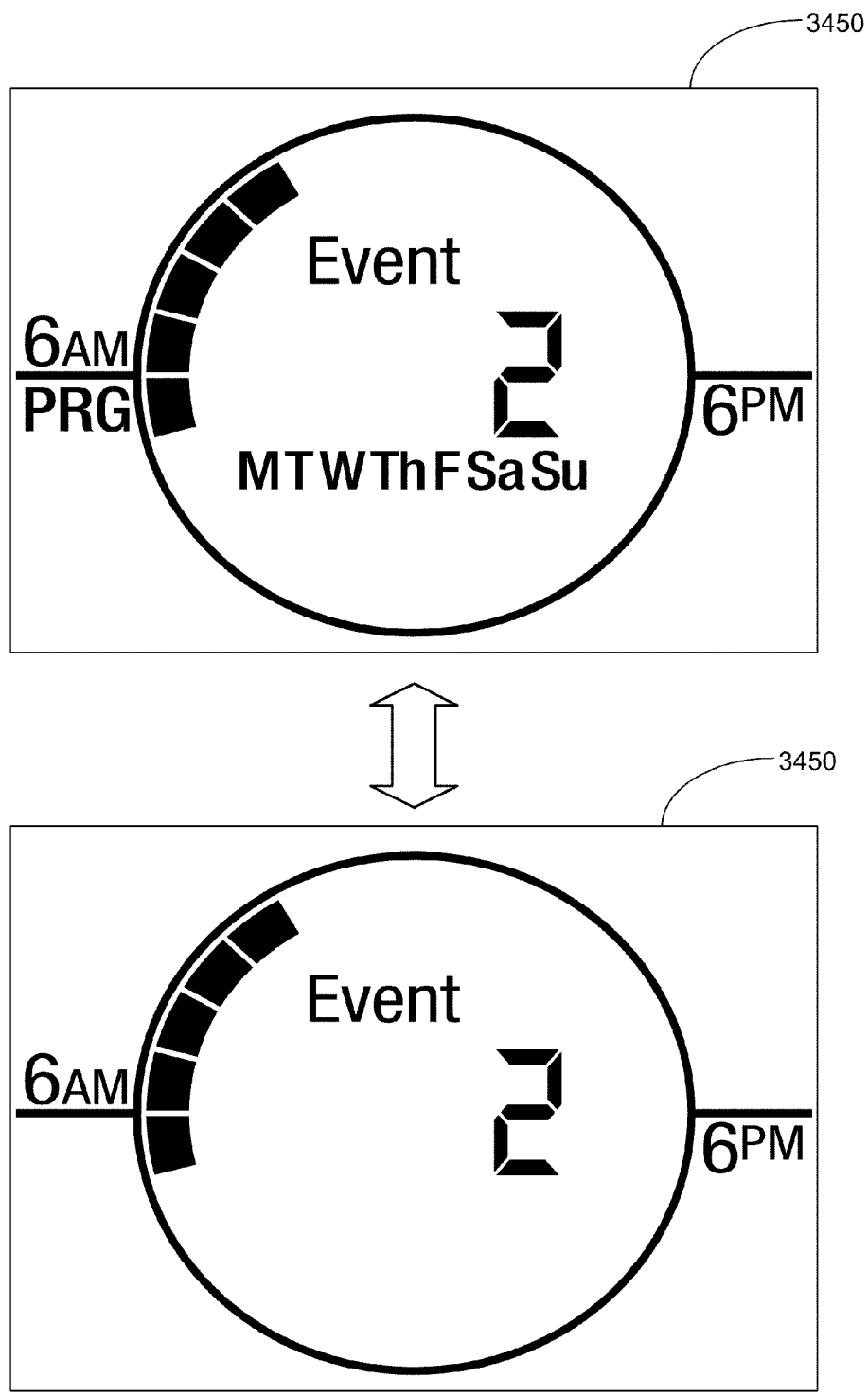
FIG. 33 illustrates a digital display associated with the configuration of a schedule related to an event number according to some inventive principles of this patent disclosure.

FIG. 33 illustrates a digital display 3450 associated with the configuration of a schedule related to an event number according to some inventive principles of this patent disclosure. Once an event number is chosen, the user can select which days the event should occur on (i.e., or be activated). The day selector 3415 may cause the digital display 3450 to display groupings of days, such as a weekday selection, a weekend selection, and an all-day selection. The abbreviated day indicators, such as "M T W Th F Sa Su" can correspond to the various groupings. For example, the weekday selection would correspond to "M T W Th F" and the weekend selection would correspond to "Sa Su." The "set" button of the user interface panel 3460 may be used to enable the selection and to store the selected grouping in the storage device 3455.

Alternatively, the day selector 3415 may cause the digital display 3450 to display individual days of a week. The "set" button of the user interface panel 3460 may be used to select one or more of the individual days of the week and to store the individual days in the storage device 3455. To select any day combination, pressing the "up" button will cause the next day to flash, and pressing the "down" button will cause the previous day to flash. The flashing day is the day under selection. Pressing the "set" button causes the day that is flashing to be toggled between selected and not-selected, and then the next day will flash as the day under selection. A day corresponding to a selected day is constantly on, and a day corresponding to a not-selected day is constantly off.

To complete the day selection, the user may press the "set" button when the "PRG" icon is flashing, which may flash between Sunday and Monday. In other words, when choosing which days are selected or not-selected, the order of choosing can be "M, Tu, W, Th, F, Sa, Su, PGM, M, Tu . . . ." When choosing groupings of days or individual days, the order can be All Days, Weekdays, Weekends, and Individual Days, and can be selected using one of the buttons of the user interface panel 3460. While these are the preferred orders of selection, any order can be used.

Figure 34:
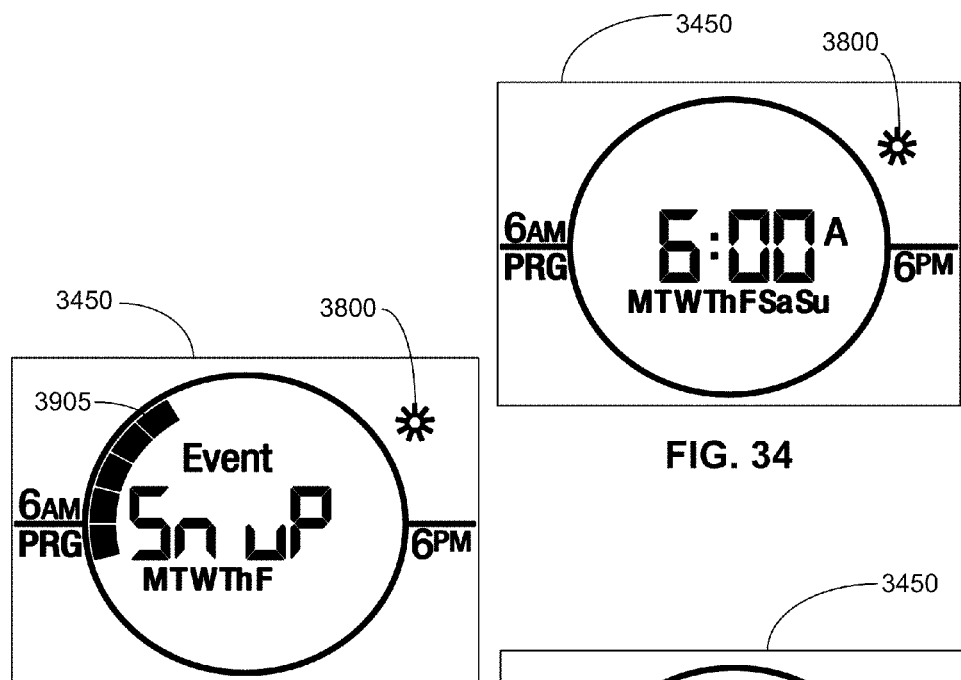
FIGS. 34-37 illustrate a digital display associated with selecting an on-time and an off-time for an event according to some inventive principles of this patent disclosure.
Figure 35:
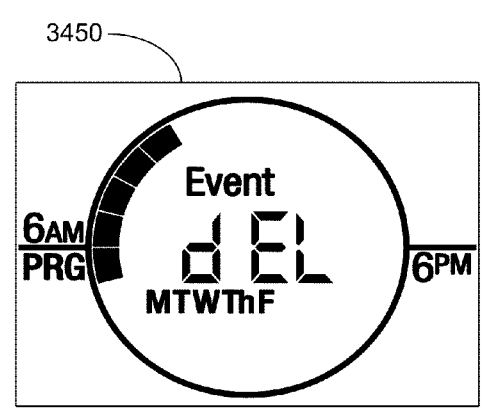
Figure 36:
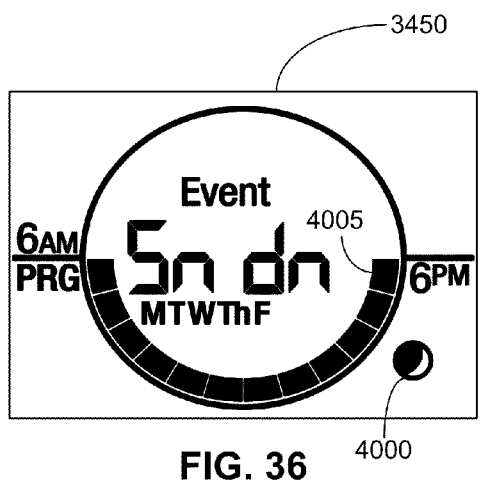

FIGS. 34-37 illustrate a digital display associated with selecting an on-time and an off-time for an event according to some inventive principles of this patent disclosure. The user can select an on-time and an off-time for the event using the user interface panel 3460. The user can choose between setting a specific on-time or off-time, as shown in FIG. 34, or alternatively, by choosing a predefined on-time and off-time, as shown in FIGS. 35 and 36.

For example, the predefined on-time and off-time of FIG. 35 correspond to a "sunrise" or "sun up" abbreviated by "Sn uP" on the digital display 3450. This means that the event is scheduled with a predefined on-time and a predefined off-time, as indicated by the icons 3905. Similarly, the predefined on-time and off-time of FIG. 36 correspond to a "sunset" or "sun down" abbreviated by "Sn dn" on the digital display 3450. This means that the event is scheduled with a predefined on-time and a predefined off-time, as indicated by the icons 4005. While the icons 3905 and 4005 indicate certain icons can correspond to the "Sn uP" and "Sn dn" selections, it should be understood that other combinations of icons representing different times can be used.

Any one of the first time selector 3410 or the second time selector 3420 can automatically determine a time of sunrise or sunset based on previously inputted geographic information. The geographic information selector 3430 (of FIG. 30) can configure geographic parameters responsive to user input. The geographic information can include a latitude coordinate, a longitude coordinate, a time zone, or a sunrise/sunset offset. The sunrise/sunset offset is a user designated offset from the actual sunrise or sunset times. The automatically determined sunrise and sunset times can be used to determine the predefined on-time and off-time of the event. For example, any one of the first time selector 3410 and second time selector 3420 can store the time of the sunrise or the time of the sunset as the on-time or off-time of the event in the storage device 3455. Alternatively, the geographic information may be communicated to the device from a remote source automatically such as the internet, network, global positioning signals, and the like. In addition, any other geographic, astronomic, or other suitable data may be communicated either manually or from a remote source to the device.

Figure 37:
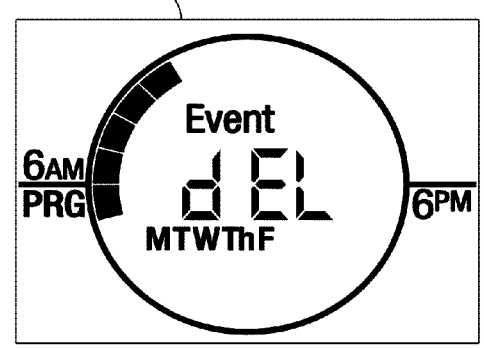

The "up" and "down" buttons of the user interface panel 3460 can be used to scroll between the different options for selecting the on-time and off-time. The "set" button can be used to accept and store the selection in the storage device 3455. While selecting times, the sun icon 3800 can be displayed when the time is between a predefined range corresponding to when the sun is generally up, and the moon icon 4000 can be displayed when the time is between a predefined range corresponding to when the sun is generally down. The user can also delete an event by scrolling to the "dEL" option as shown in FIG. 37. To delete an event, the user can press the "set" button on the user interface panel 3460 when the "dEL" option is displayed on the digital display 3450. Any number of events can be stored, however, preferably a limit of 50 events are stored for one version of the digital wiring device, and a limit of 3 events are stored for another version of the digital wiring device. A "menu" button on the user interface panel 3460 can be used to select between higher level configuration options.

The mode selector 3440 (of FIG. 30) can configure various modes of the digital wiring device 3400 responsive to user input. For example, the mode selector 3440 can configure a random mode. After the on-time and off-time have been configured for an event, if the random mode is selected, the randomizer 3435 can shift the on-time or the off-time by a predefined amount of time based on an aspect of the event. For example, the randomizer 3435 can shift the on-time or off-time by a predefined amount of time based on a length of the event. Specifically, the randomizer 3435 can shift the on-time or the off-time by an amount of time between about +20 minutes and −20 minutes when the length of the event is longer than about 40 minutes, by an amount of time between about +10 minutes or −10 minutes when the length of the event is longer than about 20 minutes, by an amount of time between about +20 minutes and −20 minutes when the length of the event is less than about 1420 minutes, or by an amount of time between about +10 minutes and −10 minutes when the length of the event is between about 20 minutes and about 40 minutes. The randomizer 3435 can shift neither the on-time nor the off-time when the length of the event is about 20 minutes or less. Further, the randomizer 3435 can shift neither the on-time nor the off-time when the length of the event is longer than about 1420 minutes. The random mode can be used to give the appearance that a location is occupied or for any other suitable purpose.

Figure 38:
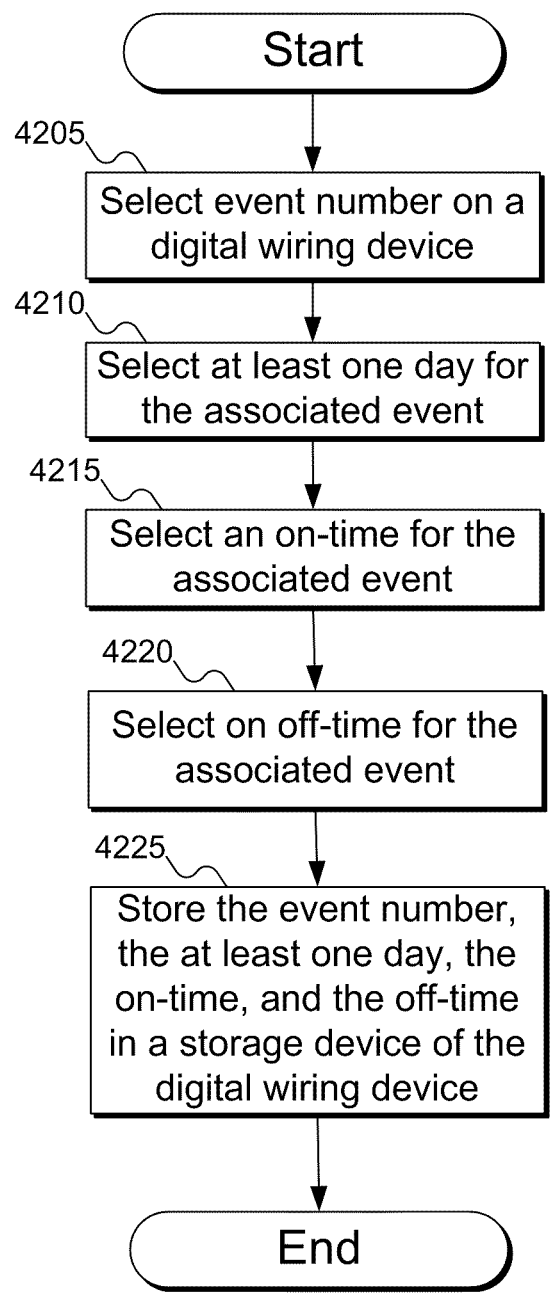
FIG. 38 is a flow diagram illustrating an embodiment of a technique for selecting and storing an on-time and an off-time associated with an event.

FIG. 38 is a flow diagram illustrating an embodiment of a technique for selecting and storing an on-time and an off-time associated with an event. At 4205, an event number is selected on a digital wiring device. At least one day is selected at 4210 for the associated event. An on-time and an off-time associated with the event are selected at 4215 and 4220. At 4225, the event number, the at least one day, the on-time, and the off-time are stored in a storage device of the digital wiring device.

Figure 39:
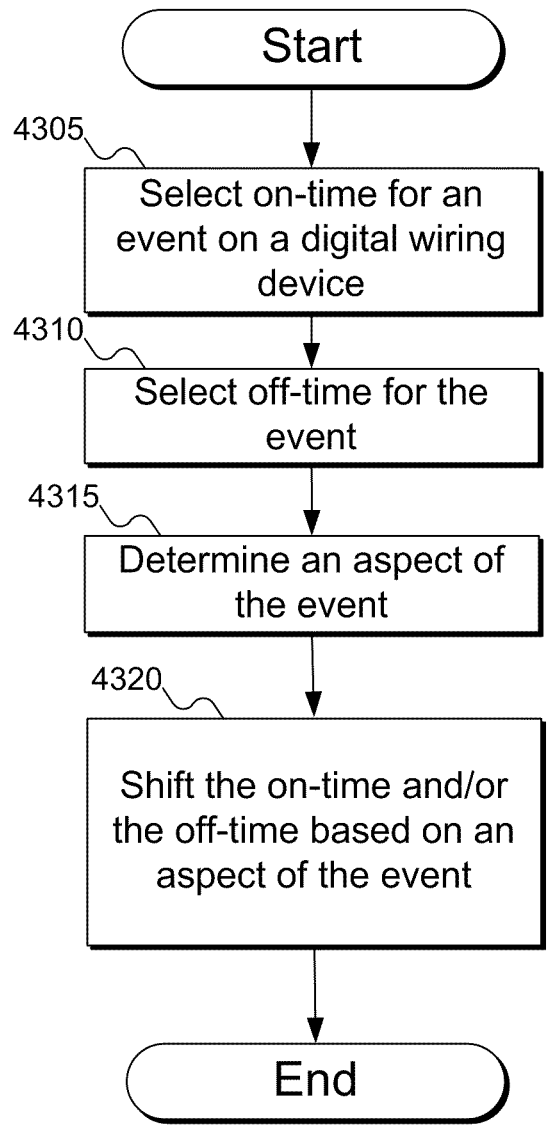
FIG. 39 is a flow diagram illustrating an embodiment of a technique for randomly shifting the on-time and/or the off-time based on an aspect of the event.

FIG. 39 is a flow diagram illustrating an embodiment of a technique for randomly shifting the on-time and/or the off-time based on an aspect of the event. At 4305 and 4310, an on-time and an off-time are selected for an event on a digital wiring device. At 4315, an aspect of the event, such as its length, is determined Finally, at 4320, the on-time and/or the off-time of the event is shifted based on an aspect of the event, such as the length.

Figure 40:
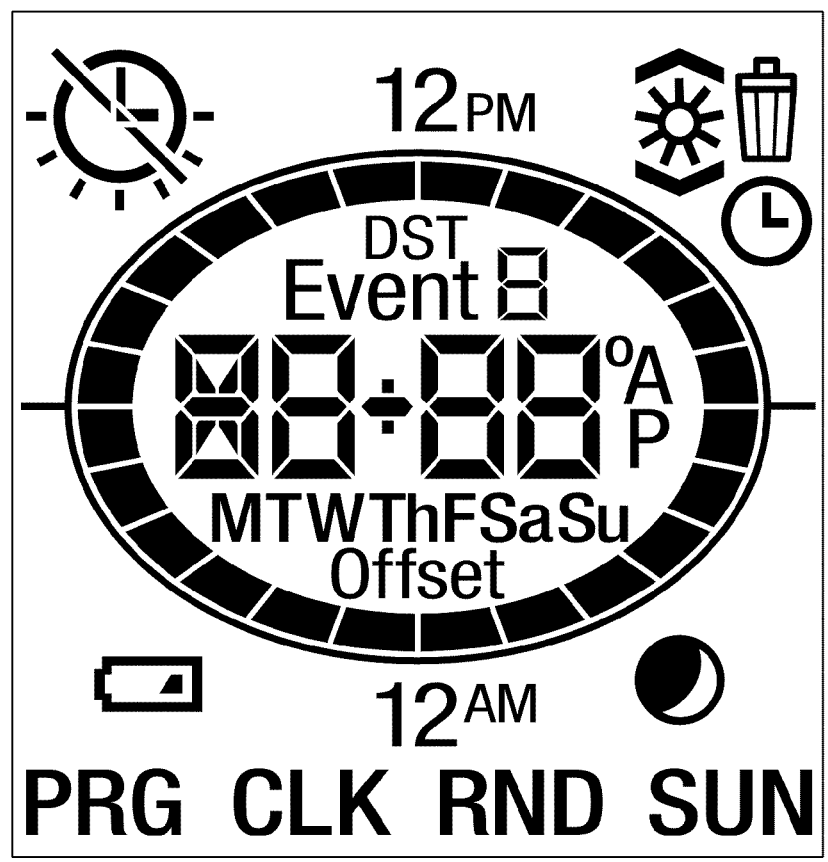
FIG. 40 is one example embodiment of a digital display according to some inventive principles of this patent disclosure.
Figure 41:
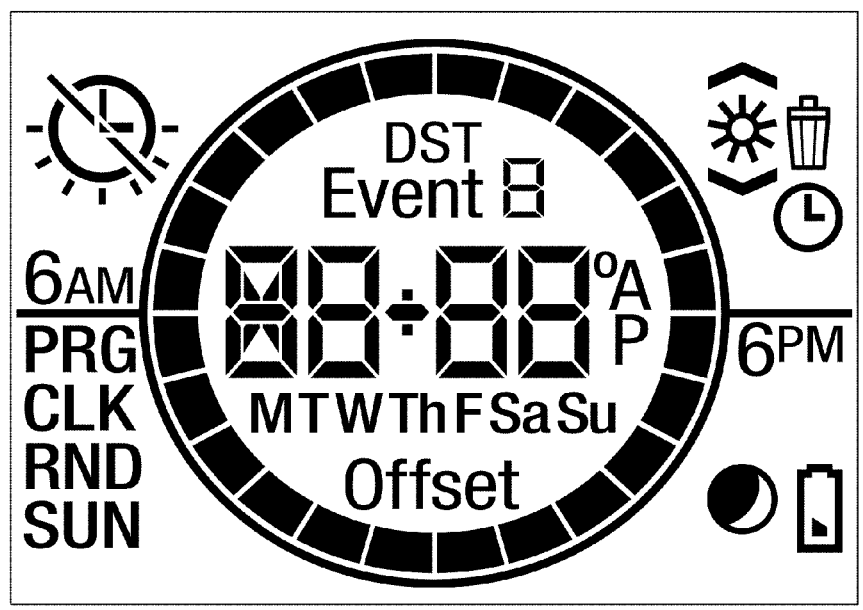
FIG. 41 is another example embodiment of a digital display according to some inventive principles of this patent disclosure.

FIG. 40 is one example embodiment of a digital display according to some inventive principles of this disclosure. FIG. 41 is another example embodiment of a digital display according to some inventive principles of this disclosure.

Some of the aspects of the digital display of FIGS. 40 and 41 have been described above. The PRG icon may be displayed when the digital wiring device is being programmed or otherwise configured. The CLK icon may be displayed when current clock is being programmed or otherwise configured. The RND icon may be displayed when the digital clock is configured to operate in the random mode, otherwise known as a "vacation" mode. The SUN icon may be displayed when the digital wiring device is inputting geographic information related to the sunrise or sunset parameters. The "Offset" icon may be displayed when an offset to the sunrise and/or sunset times is applied. The battery icon may be displayed when the digital wiring device is operating in battery backup mode, or to indicate a level of remaining charge stored in the battery. The DST icon may indicate that daylight savings time is observed. The "Event 8" icon can indicate a particular event that is currently active. The garbage icon can indicate a deletion operation or that something is deleted. The sun icon can be displayed when the time is between a predefined range corresponding to when the sun is generally up, and the moon icon can be displayed when the time is between a predefined range corresponding to when the sun is generally down. The arrows proximate to the sun icon can indicate that the sun is rising or setting.

Some of the embodiments disclosed in this patent application have been described with specific mechanical, configuration, and operational features, but the inventive principles also contemplate other types of mechanical, configuration, and operational aspects. For example, in some embodiments, the digital display may specifically be a liquid crystal display (LCD) or other appropriate display, the battery may be a re-chargeable battery, the output of the digital wiring device may be controlled by a relay, which connects or disconnects the output to alternating current (AC) power, the back light may be a light emitting diode (LED), and so forth.

The inventive principles also contemplate several types of digital wiring devices. The wiring device may be implemented with digital circuitry such as a microprocessor or other digital components. Other possibilities include implementing the wiring device using analog circuitry. Yet other possibilities include any combination of digital and analog circuitry. Logic used to implement control functions may include hardware, firmware, software, or various combinations thereof.

The inventive principles may also be applied to further example embodiments. For example, the digital wiring device may include a thermistor test, switch diagnostics, or a battery test. The digital wiring device may also include a firmware identifier to indicate the current version of firmware. The digital wiring device may have, for example, a professional mode and a standard or basic mode, and a means for configuring one of the various modes. The digital wiring device can include operating modes other than those described above, such as an active mode, a sleep mode, or a deep sleep mode. A calendar may be included and configurable within the digital wiring device.

Some embodiments include a method, comprising selecting an event number on a digital wiring device for one or more events, selecting at least one day for the one or more events, and selecting an on-time for the one or more events, selecting an off-time for the one or more events; and storing the event number, the at least one day, the on-time, and the off-time in a storage device of the digital wiring device.

Selecting the event number may include displaying a flashing integer on a digital display of the digital wiring device, the flashing integer corresponding to the event number under selection, pressing a button to increment the flashing integer, pressing a button to decrement the flashing integer, and pressing a set button to store the event number corresponding to the flashing integer in a storage device of the digital wiring device.

Selecting the at least one day may include selecting from a group comprising weekdays, weekends, and all days, all of the same day, or any suitable combination of days, and storing the selected group of days for the one or more events in a storage device of the digital wiring device. Selecting the at least one day may also include selecting one or more individual days, and storing the selected individual days for the one or more events in a storage device of the digital wiring device.

Selecting an on-time may include selecting one of sunrise and sunset, or other suitable astronomic time, as the on-time, automatically determining a time of sunrise and sunset based on previously inputted geographic information, and storing the time of one of sunrise and sunset as the on-time for the one or more events in a storage device of the digital wiring device.

Selecting an off-time may include selecting one of sunrise and sunset as the off-time, automatically determining a time of sunrise and sunset based on previously inputted geographic information, and storing the time of one of sunrise and sunset as the off-time for the one or more events in the storage device of the digital wiring device.

Before selecting the on-time and the off-time, geographic information may be inputting from a user, including: inputting a latitude coordinate, inputting a longitude coordinate, inputting a time zone, or inputting a sunrise/sunset offset. Alternatively, the geographic information may be inputted automatically or from a remote source such as a network, the internet, or the like.

Some embodiments include a digital wiring device, comprising an event selector to configure one or more events responsive to first user input, a day selector to configure at least one day for the one or more events responsive to second user input, a first time selector to configure an on-time for the one or more events responsive to third user input, a second time selector to configure an off-time for the one or more events responsive to fourth user input, and a storage device to store the event number, the at least one day, the on-time, and the off-time in a storage device of the digital wiring device.

In some embodiments, the digital wiring device may further include a digital display associated with the event selector, wherein the digital display is structured to display a flashing integer or other suitable character corresponding to the event number under selection. In some embodiments, the digital wiring device may further include an up button to increment the flashing integer, a down button to decrement the flashing integer, or a set button to store the event number corresponding to the flashing integer in a storage device of the digital wiring device.

In some embodiments, the digital wiring device may include a digital display associated with the day selector, wherein the digital display is structured to display at least one of a weekday selection, a weekend selection, and an all-day selection. The digital wiring device may further include a set button to select and to store one of the weekday selection, the weekend selection, and the all-day selection in a storage device of the digital wiring device.

In some embodiments, the digital wiring device may include a digital display associated with the day selector, wherein the digital display is structured to display individual days of a week. The digital wiring device may further include a set button to select one or more of the individual days of the week and to store said days in a storage device of the digital wiring device.

In some embodiments, the digital wiring device may include a digital display associated with any one of the first time selector and the second time selector, wherein the digital display is structured to display a sunrise indicator selection corresponding to a predefined on-time and a predefined off-time. The sunrise indicator selection may include the abbreviation S n u P.

In some embodiments, any one of the first time selector and second time selector is structured to automatically determine a time of sunrise based on previously inputted geographic information.

In some embodiments, any one of the first time selector and second time selector is structured to store the time of sunrise as the on-time for the one or more events in a storage device of the digital wiring device. The time of sunrise can refer to a moment in time or any predefined time range.

Some embodiments include a digital display associated with any one of the first time selector and the second time selector, wherein the digital display is structured to display a sunset indicator selection corresponding to a predefined on-time and a predefined off-time. The sunset indicator selection may include the abbreviation S n d n.

In some embodiments, any one of the first time selector and the second time selector is structured to automatically determine a time of sunset based on previously inputted geographic information.

In some embodiments, any one of the first time selector and the second time selector is structured to store the time of sunset as the off-time for the one or more events in a storage device of the digital wiring device. The time of sunset can refer to a moment in time or any predefined time range.

In some embodiments, the digital wiring device may include a geographic information selector to configure geographic parameters responsive to fifth user input; and a digital display associated with the geographic information selector, wherein the geographic information includes a latitude coordinate, a longitude coordinate, a time zone, or a sunrise/sunset offset.

Some embodiments include a system for configuring a digital wiring device, comprising an event selector to configure one or more events responsive to first user input, a day selector to configure at least one day for the one or more events responsive to second user input, a first time selector to configure an on-time for the one or more events responsive to third user input, a second time selector to configure an off-time for the one or more events responsive to fourth user input, a digital display associated with the event selector, the day selector, the first time selector, and the second time selector, a user interface panel including a menu button, a set button, an up button, and a down button, to configure the event number, the at least one day, the on-time, and the off-time, and a storage device to store the event number, the at least one day, the on-time, and the off-time.

Some embodiments include a digital wiring device configured to be mounted in a single-gang electrical box, including a user interface panel, a digital display, and a paddle including a transparent portion to reveal at least a portion of the digital display and an opaque portion to cover at least a portion of the user interface panel. The paddle can overlap at least in part the digital display. The paddle may be moveable between a closed position and an open position.

In some embodiments, the paddle is structured to rotate from a first closed position to a second open position. In some embodiments, the paddle is rotatable between a first closed position and a second open position.

In some embodiments, the digital wiring device may include a frame, the paddle hingedly attached to the frame, and a base unit which supports at least one of the user interface panel and the digital display, wherein the frame is attached to the base unit. The digital wiring device may include a mating element to engage a projection of the paddle and maintain the paddle in an open position. The projection may be a curved projection. In some embodiments, one of the projection and the mating element are structured to flex the other of the projection and the mating element responsive to a user positioning the paddle towards the open position. In some embodiments, the one of the projection and the mating elements are structured to flex the other of the projection and the mating element inwardly towards the base unit responsive to the user applying pressure to release and close the paddle.

In some embodiments, the paddle is rotatable between a position proximate to and distal from the base unit.

In some embodiments, the paddle is structured to rotate outwardly from the base unit. In some embodiments, a surface of the paddle is structured to be positioned and maintained at an angle greater than or equal to about 90 degrees from a surface of the base unit. In some embodiments, the surface of the paddle is structured to be positioned and maintained at an angle of about 110 degrees from the surface of the base unit. In some embodiments, the paddle is movable to an open and maintained position forming an arc of about 90 degrees or greater between the base unit and the paddle.

In some embodiments, the digital wiring device is configured to be mounted in a single-gang electrical box where the single-gang electrical box has nominal dimensions of not greater than three inches by two inches.

Some embodiments include a method, comprising rotating a paddle of a digital wiring device from an open position to a closed position, revealing a digital display of the digital wiring device through a transparent portion of the paddle, and covering a user interface panel of the digital wiring device with an opaque portion of the paddle. The method may include rotating the paddle from the closed position to the open position at an angle greater than or equal to about 90 degrees from a base unit.

In some embodiments, a mating element engages a curved projection of the paddle. The method may include automatically holding the paddle in the open position, or releasing the paddle from the open position. The method may include applying pressure to the paddle to position the paddle in the automatically held open position, and flexing the mating element inwardly to the base unit responsive to the application of pressure to the paddle. The method may include rotating the paddle from the open position at an angle greater than or equal to about 90 degrees from a base unit to the closed position.

In some embodiments, the method may include applying pressure to the paddle to release the paddle from the open position, and flexing the mating element inwardly to the base unit responsive to the application of pressure to the paddle.

Some embodiments include a system, comprising a digital wiring device, including a user interface panel. The user interface panel may include a digital display, a paddle including a window to reveal at least a portion of the digital display, a frame, the paddle hingedly attached to the frame, and a base unit which supports at least one of the user interface panel and the digital display, wherein the paddle is structured to rotate from a first closed position to a second open position. The paddle may further include an opaque portion to cover at least a portion of the user interface panel.

In some embodiments, when the paddle is in the second open position, a surface of the paddle is maintained at an angle greater than or equal to about 90 degrees from a surface of the base unit. In some embodiments, when the paddle is in the second open position, the surface of the paddle is maintained at an angle about 110 degrees from the surface of the base unit.

In some embodiments, the paddle is structured to rotate outwardly from the base unit.

In some embodiments, the digital wiring device is configured to be mounted in a single-gang electrical box where the single-gang electrical box has nominal dimensions of not greater than three inches by two inches.

Some embodiments include a digital wiring device configured to be mounted in a single-gang electrical box, comprising a digital display, a back light configured to illuminate at least a portion of the digital display, a user interface panel including at least one actuator operatively associated with the back light, and a paddle operatively associated with the back light. In some embodiments, the back light is configured to illuminate at least a portion of the digital display responsive to any one of a press of the paddle, a press of the at least one actuator, or a lift of the paddle to an open position.

In some embodiments, the back light is configured to illuminate at least a portion of the digital display responsive to a user pressing the paddle when the paddle is in a closed position. In some embodiments, the back light is configured to illuminate at least a portion of the digital display responsive to a user opening the paddle to an open position.

In some embodiments, the digital wiring device further comprises a frame, the paddle hingedly attached to the frame, and a base unit which supports at least one of the user interface panel and the digital display, wherein the frame is attached to the base unit, and wherein the base unit includes an actuator operatively associated with the back light and configured to be actuated by a surface of the paddle when the paddle is in a closed position, wherein the back light is configured to illuminate at least a portion of the digital display responsive to a user pressing the paddle when the paddle is in the closed position, thereby actuating the actuator and energizing the back light.

Some embodiments include a method for operating a digital wiring device configured to be mounted in a single-gang electrical box, comprising illuminating a back light of a digital display of the digital wiring device when a user actuates a paddle of the digital wiring device, and revealing at least a portion of the illuminated digital display through a window of the paddle when the paddle is in a closed position. The method may include illuminating the back light of the digital display when the user presses the paddle inwardly toward the digital wiring device. The method may include covering at least a portion of the user interface panel with an opaque portion of the paddle when the paddle is in the closed position. The method may include illuminating the back light of the digital display when the user opens the paddle to an open position, and revealing at least a portion of the illuminated digital display and a user interface panel when the paddle is in the open position. The method may include illuminating the back light of the digital display when the user performs at least one of pressing one or more actuators of a user interface panel, pressing the paddle, and opening the paddle. The method may include actuating an actuator by the paddle when in the closed position, and energizing the back light of the digital display.

Some embodiments include a method for operating a digital wiring device configured to be mounted in a single-gang electrical box, comprising moving a paddle of said digital wiring device from a first position to a second position, activating a light in response to said moving step, said light illuminating a digital display, and viewing at least a portion of said digital display through said paddle. The first position may correspond to a closed at-rest position and the second position may correspond to a momentary pressed position, and moving the paddle comprises pressing the paddle from the closed at-rest position to the momentary pressed position. Alternatively, the first position corresponds to a closed position and the second position corresponds to an open position, and moving the paddle comprises lifting the paddle from the closed position. In another embodiment, the first position corresponds to a closed position and the second position corresponds to an open and maintained position, and moving the paddle comprises moving the paddle from the closed position to the open and maintained position. In yet another embodiment, the first position corresponds to an open and maintained position and the second position corresponds to a closed position, and moving the paddle comprises moving the paddle from the open and maintained position to the closed position.

Some embodiments include a system for operating a digital wiring device configured to be mounted in a single-gang electrical box, comprising a digital display, a back light to illuminate at least a portion of the digital display, a user interface panel including at least one actuator operatively associated with the back light, a paddle including a window and an opaque portion, a frame, the paddle hingedly attached to the frame, and a base unit which supports at least one of the user interface panel and the digital display, wherein the paddle is operatively associated with the back light.

In some embodiments, the back light is configured to illuminate at least a portion of the digital display responsive to a user pressing the paddle when the paddle is in a closed position. At least a portion of the digital display may be viewable through a window in the paddle. In some embodiments, at least a portion of the user interface panel is covered by the opaque portion of the paddle when the paddle is in the closed position.

Some embodiments include an actuator operatively associated with the back light and configured to be actuated by a surface of the paddle when the paddle is in a closed position. In some embodiments, the actuator is structured to receive the surface of the paddle when the paddle is in the closed position, thereby actuating the actuator and energizing the back light.

Some embodiments include a digital wiring device configured to be mounted in a single-gang electrical box, comprising a digital display, a power input configured to receive power from an electrical supply in a normal power mode, a detection circuit configured to detect a power loss of the electrical power supply, a battery configured to provide power to the power input of the digital wiring device in a battery backup mode based on the detection of the power loss, and a back light to illuminate at least a portion of the digital display, wherein the back light is disabled in the battery backup mode.

In some embodiments, the digital wiring device includes at least one programmable instruction, wherein the battery backup mode prevents loss of the at least one programmable instruction.

In some embodiments, the battery has a battery life and the disablement of the back light extends the battery life.

In some embodiments, the back light is enabled when the digital wiring device is in the normal power mode. In some embodiments, the digital wiring device is structured to prevent the back light from illuminating the digital display when the digital wiring device is in the battery backup mode.

Some embodiments include a paddle including a window, wherein the back light is configured to illuminate at least a portion of the digital display and reveal at least a portion of the digital display through the window of the paddle when the digital wiring device is in the normal power mode and the paddle is pressed by a user.

Some embodiments include a paddle, wherein the back light is configured to illuminate at least a portion of the digital display when the digital wiring device is in the normal power mode and the paddle is opened by a user.

Some embodiments include one or more actuators, wherein the back light is configured to illuminate at least a portion of the digital display when the digital wiring device is in the normal power mode and responsive to an actuation of the one or more actuators by a user.

Some embodiments include a method for preserving at least one programmable instruction in the event of a power loss of a digital wiring device mountable in a single-gang electrical gang box, detecting a power loss from an electrical supply, switching a power input of the digital wiring device from a normal power mode to a batter backup mode using power from a battery, and disabling a back light of a digital display. Disabling the back light extends the life of the battery. The method may further include disabling the back light of the digital display when the digital wiring device is in the battery backup mode, or enabling the back light of the digital display when the digital wiring device is in the normal power mode. The method may include preventing the back light from illuminating at least a portion of the digital display when the digital wiring device is in the battery backup mode. The method may include illuminating at least a portion of the digital display and revealing at least a portion of the digital display through a window of a paddle when the digital wiring device is in the normal power mode and the paddle is pressed by a user. The method may include illuminating at least a portion of the digital display and revealing at least a portion of the digital display when the digital wiring device is in the normal power mode and the paddle is opened by a user. The method may include illuminating at least a portion of the digital display when the digital wiring device is in the normal power mode and a user presses one or more actuators of a user interface panel associated with the digital wiring device.

Some embodiments include a method for randomizing the timing of events on a digital wiring device, comprising selecting an on-time for an event on the digital wiring device, selecting an off-time for the event, and randomly shifting at least one of the on-time and the off-time by a predefined amount of time based on an aspect of the event. In some embodiments, the aspect of the event corresponds to a length of the event. The method may further include selecting a random mode.

In some embodiments, the method includes randomly shifting at least one of the on-time and the off-time by an amount of time between about +20 minutes and −20 minutes when the length of the event is longer than about 40 minutes.

In some embodiments, the method includes randomly shifting at least one of the on-time and the off-time by an amount of time between about +10 minutes and −10 minutes when the length of the event is longer than about 20 minutes.

In some embodiments, the method includes randomly shifting neither the on-time nor the off-time when the length of the event is about 20 minutes or less.

In some embodiments, the method includes randomly shifting at least one of the on-time and the off-time by an amount of time between about +20 minutes and −20 minutes when the length of the event is less than about 1420 minutes.

In some embodiments, the method includes randomly shifting at least one of the on-time and the off-time by an amount of time between about +10 minutes and −10 minutes when the length of the event is between about 20 minutes and about 40 minutes.

In some embodiments, the method includes randomly shifting neither the on-time nor the off-time when the length of the event is longer than about 1420 minutes.

Some embodiments include a digital wiring device mountable in an electrical gang box, comprising an on-time selector to configure an on-time for an event, an off-time selector to configure an off-time for the event, and a randomizer to shift at least one of the on-time and the off-time by a predefined amount of time based on a length of the event.

In some embodiments, the in-wall digital wiring device includes a mode selector to configure a random mode responsive to user input, and a digital display, wherein the digital display is structured to indicate the random mode.

In some embodiments, the randomizer is structured to shift at least one of the on-time and the off-time by an amount of time between about +20 minutes and −20 minutes when the length of the event is longer than about 40 minutes.

In some embodiments, the randomizer is structured to shift at least one of the on-time and the off-time by an amount of time between about +10 minutes and −10 minutes when the length of the event is longer than about 20 minutes.

In some embodiments, the randomizer is structured to shift neither the on-time nor the off-time when the length of the event is about 20 minutes or less.

In some embodiments, the randomizer is structured to shift at least one of the on-time and the off-time by an amount of time between about +20 minutes and −20 minutes when the length of the event is less than about 1420 minutes.

In some embodiments, the randomizer is structured to shift at least one of the on-time and the off-time by an amount of time between about +10 minutes and −10 minutes when the length of the event is between about 20 minutes and about 40 minutes.

In some embodiments, the randomizer is structured to shift neither the on-time nor the off-time when the length of the event is longer than about 1420 minutes.

Some embodiments include a system for configuring an in-wall digital wiring device, comprising an on-time selector to configure an on-time for an event, an off-time selector to configure an off-time for the event, a mode selector to configure a random mode responsive to user input, and a randomizer to shift at least one of the on-time and the off-time by a predefined amount of time based on a length of the event when the random mode is selected.

Some embodiments include a digital wiring device, comprising a digital display including icons circumferentially disposed in a substantially curved pattern, one of the icons having an animated appearance and corresponding to the current time. The one icon may flash at a predefined rate. In some embodiments, each icon corresponds to one hour of a day, and each icon includes a first state indicating that an output of the digital wiring device is scheduled as on for the corresponding hour and a second state indicating that the output of the digital wiring device is scheduled as off for the corresponding hour. In some embodiments, the one icon corresponding to the current hour is configured to flash at a rate of once per second. In some embodiments, the digital display includes a schedule-at-a-glance.

Some embodiments include an apparatus, comprising a digital timer configured to be mounted in an electrical gang box, the digital timer including a digital display having twenty four icons circumferentially disposed in a substantially curved pattern, each icon corresponding to one hour of a day. In some embodiments, each icon includes a first state indicating that an output of the digital wiring device is scheduled as on for the corresponding hour and a second state indicating that the output of the digital wiring device is scheduled as off for the corresponding hour.

Some embodiments include a method, comprising disposing icons in a substantially curved pattern on a display of a digital wiring device, each icon corresponding to one hour of a day, and flashing one of the icons corresponding to the current hour at a predefined rate. The method may include flashing the one icon corresponding to the current hour at a rate of once per second. The method may include displaying each icon in one of (a) a first state indicating that an output of the digital wiring device is scheduled as on for the corresponding hour, and (b) a second state indicating that an output of the digital wiring device is scheduled as off for the corresponding hour.

Some embodiments include a system for conveying a schedule at a glance for an in-wall digital wiring device, comprising a digital display including icons circumferentially disposed in a substantially curved pattern, each icon corresponding to a time of a day, and a current-time flasher to change one of the icons corresponding to the current time from a first state to a second state, and from the second state to the first state, at a predefined rate.

In some embodiments, the digital wiring device is a digital timer. The digital timer may include at least one cycle, and may further include information provided on the digital display to show a schedule of the cycle. The schedule may comprise a schedule-at-a-glance for a complete duration of the cycle. The schedule-at-a-glance may include a flashing icon to denote a specific point in the cycle. The specific point in the cycle can represent the present time. The schedule-at-a-glance can be in the form of an oval, ellipse, or a circle.

Some embodiments include a system, comprising a digital wiring device mountable within an electrical gang box, the digital wiring device including an input to receive electrical power from an electrical supply, and at least one communication interface configured to communicate with a remote control unit, the at least one communication interface configured to at least receive an override signal from the remote control unit, the override signal being configured to override one or more functions of the digital wiring device, wherein the override signal is associated with at least a temporary-on mode and a temporary-off mode. In some embodiments, the override signal is associated with at least a permanent-on mode and a permanent-off mode. The system may include a wall mount to attach the digital wiring device in a wall. The system may further include an output of the digital wiring device. The temporary-on mode may correspond to a mode in which the output of the digital wiring device is on independent of any scheduled events until a next scheduled event. The temporary-off mode may correspond to a mode in which the output of the digital wiring device is off independent of any scheduled events until the next scheduled event. The permanent-on mode may correspond to a mode in which the output of the digital wiring device is on independent of any scheduled events and independent of a current time. The permanent-off mode may correspond to a mode in which the output of the digital wiring device is off independent of any scheduled events and independent of the current time. In some embodiments, the one or more messages are associated with a normal timing mode. The normal timing mode may correspond to a mode in which the output is on when an event is active and off when an event is not active.

Some embodiments include a method for remotely controlling a digital wiring device, comprising receiving an electrical current for powering the digital wiring device at a first input, receiving one or more messages to the digital wiring device at a second input, and overriding one or more functions of the digital wiring device based on the one or more messages received. The method may include transmitting the one or more messages from a remote control unit to the second input of the digital wiring device. The method may include temporarily overriding a normal timing mode of the digital timer with at least one of a temporary-on mode and a temporary-off mode. In some embodiments, the method may include during the temporary-on mode, enabling an output of the digital wiring device independent of any scheduled events until a next scheduled event.

In some embodiments, the method may include during the temporary-off mode, disabling the output of the digital wiring device independent of any scheduled events until the next scheduled event. The method may include temporarily overriding a normal timing mode of the digital timer with at least one of a permanent-on mode and a permanent-off mode.

In some embodiments, the method may include during the permanent-on mode, enabling an output of the digital wiring device independent of any scheduled events and independent of a current time. In some embodiments, the method may include during the permanent-off mode, disabling the output of the digital wiring device independent of any scheduled events and independent of the current time.

Some embodiments may include a digital timer, comprising an input to receive electrical power from an electrical supply, and at least one communication interface configured to communicate with a remote control unit, the at least one communication interface configured to at least receive an override signal from the remote control unit, the override signal being configured to override one or more functions of the digital wiring device, wherein the override signal is associated with at least one of a temporary-on mode, a temporary-off mode, a permanent-on mode, and a permanent-off mode.

Thus, the embodiments described herein can be modified in arrangement and detail without departing from the inventive concepts. Accordingly, such changes and modifications are considered to fall within the scope of the following claims.

The invention claimed is:

1. A digital wiring device configured to be mounted in a single-gang electrical box, comprising:
   a digital display;
   a power input configured to receive power from an electrical supply in a normal power mode and to provide power to the digital display;
   a detection circuit configured to detect a power loss of the electrical power supply;
   a battery configured to provide power to the power input of the digital wiring device in a battery backup mode based on the detection of the power loss such that the display remains active; and
   a back light operable separate from the display to illuminate at least a portion of the digital display, wherein the back light is disabled in the battery backup mode.

2. The digital wiring device of claim 1, further comprising at least one programmable instruction, wherein the battery backup mode prevents loss of the at least one programmable instruction.

3. The digital wiring device of claim 2, wherein the battery has a battery life and the disablement of the light extends the battery life.

4. The digital wiring device of claim 1, wherein the light is enabled when the digital wiring device is in the normal power mode.

5. The digital wiring device of claim 1, further comprising a paddle including a window, wherein the light is configured to illuminate at least a portion of the digital display and reveal at least a portion of the digital display through the window of the paddle when the digital wiring device is in the normal power mode and the paddle is pressed by a user.

6. The digital wiring device of claim 1, further comprising a paddle, wherein the light is configured to illuminate at least a portion of the digital display when the digital wiring device is in the normal power mode and the paddle is opened by a user.

7. The digital wiring device of claim 1, further comprising one or more actuators, wherein the light is configured to illuminate at least a portion of the digital display when the digital wiring device is in the normal power mode and responsive to an actuation of the one or more actuators by a user.

8. The digital wiring device of claim 1, wherein the digital wiring device is configured to be mounted in a single-gang electrical box where the single-gang electrical box has nominal dimensions of not greater than three inches by two inches.

9. The digital wiring device of claim 1, wherein the digital wiring device is a digital timer.

10. A method for preserving at least one programmable instruction in the event of a power loss of a digital wiring device mountable in a single-gang electrical gang box, comprising:
    detecting a power loss from an electrical supply;
    switching a power input of the digital wiring device from a normal power mode to a battery backup mode using power from a battery; and
    disabling a back light of a digital display and continuing to operate the digital display in the battery backup mode.

11. The method of claim 10, wherein disabling the light extends the life of the battery.

12. The method of claim 10, wherein disabling the light of the digital display further comprises disabling the light of the digital display when the digital wiring device is in the battery backup mode.

13. The method of claim 10, further comprising enabling the light of the digital display when the digital wiring device is in the normal power mode.

14. The method of claim 10, further comprising preventing the light from illuminating at least a portion of the digital display when the digital wiring device is in the battery backup mode.

15. The method of claim 10, further comprising illuminating at least a portion of the digital display and revealing at least a portion of the digital display through a window of a paddle when the digital wiring device is in the normal power mode and the paddle is pressed by a user.

16. The method of claim 10, further comprising illuminating at least a portion of the digital display and revealing at least a portion of the digital display when the digital wiring device is in the normal power mode and the paddle is opened by a user.

17. The method of claim 10, further comprising illuminating at least a portion of the digital display when the digital wiring device is in the normal power mode and a user presses one or more actuators of a user interface panel associated with the digital wiring device.

18. The method of claim 10, wherein the device is configured to be mounted in a single-gang electrical box where the single-gang electrical box has nominal dimensions of not greater than three inches by two inches.

19. The method of claim 10, wherein the digital wiring device is a digital timer.

* * * * *